(12) United States Patent
Torii

(10) Patent No.: US 9,218,148 B2
(45) Date of Patent: Dec. 22, 2015

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Minoru Torii, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/469,348

(22) Filed: Aug. 26, 2014

(65) Prior Publication Data
US 2015/0062632 A1     Mar. 5, 2015

(30) Foreign Application Priority Data
Aug. 28, 2013     (JP) ................................ 2013-176250

(51) Int. Cl.
*G06F 3/12*     (2006.01)
(52) U.S. Cl.
CPC .............. *G06F 3/126* (2013.01); *G06F 3/1204* (2013.01); *G06F 3/1292* (2013.01)

(58) Field of Classification Search
USPC ........................................................ 358/1.15
See application file for complete search history.

(56) References Cited

U.S. PATENT DOCUMENTS

| 8,189,225 B1 * | 5/2012 | Lo et al. ........................ 358/1.15 |
| 2009/0052348 A1 * | 2/2009 | Kato et al. ..................... 370/254 |
| 2010/0069008 A1 * | 3/2010 | Oshima et al. ................ 455/41.3 |
| 2013/0038896 A1 * | 2/2013 | Nalewajek ..................... 358/1.15 |
| 2014/0368865 A1 * | 12/2014 | Gutnik et al. ................. 358/1.15 |

FOREIGN PATENT DOCUMENTS

JP     2013-037687 A     2/2013

* cited by examiner

*Primary Examiner* — Ngon Nguyen
(74) *Attorney, Agent, or Firm* — Canon USA Inc. IP Division

(57) ABSTRACT

An information processing apparatus transmits print data to an image forming apparatus by using near field communication or to an image forming apparatus on a network, and at this time, gives preference as a print destination to the image forming apparatus using the near field communication over the image forming apparatus capable of communicating with the information processing apparatus using the network.

16 Claims, 27 Drawing Sheets

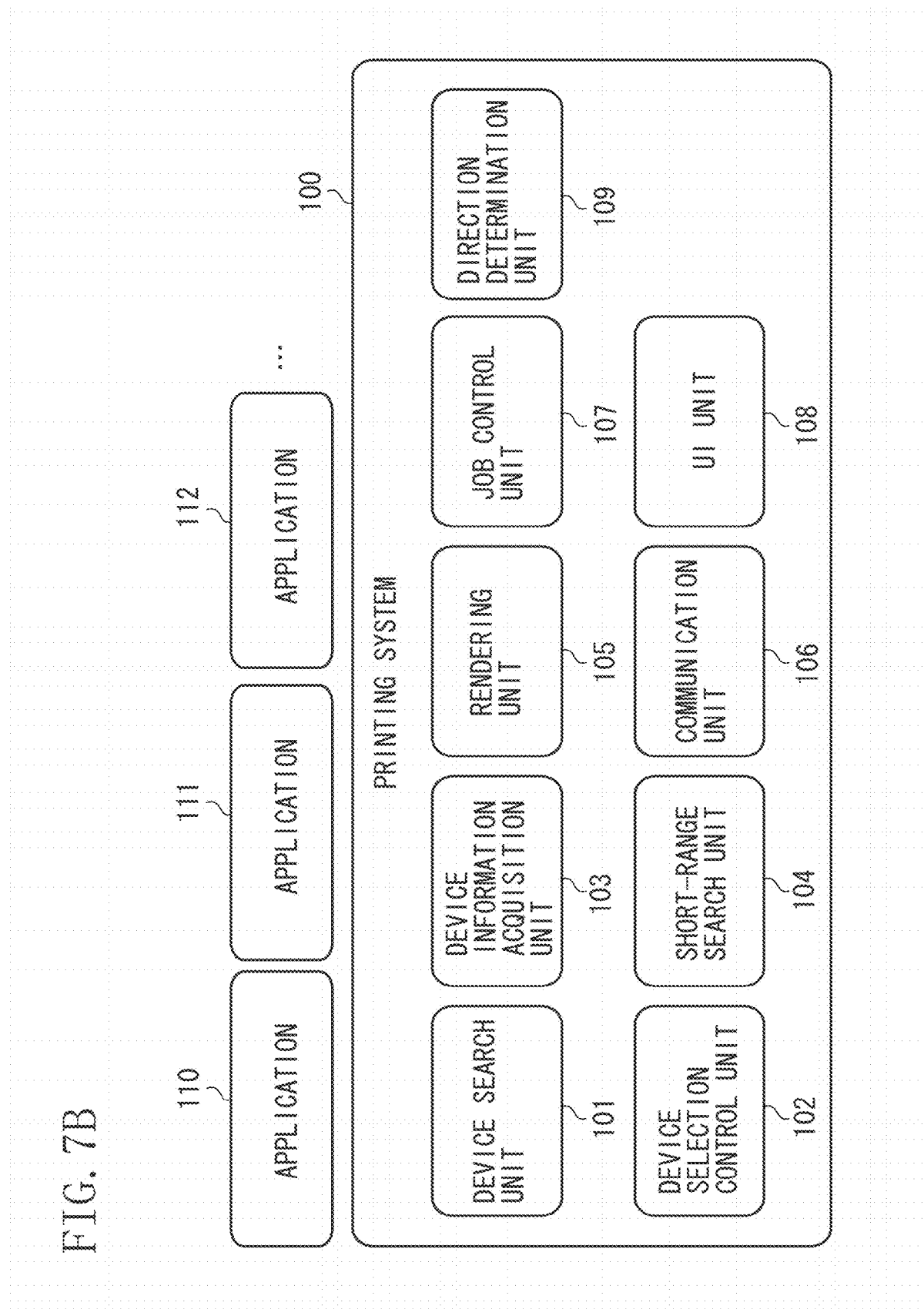

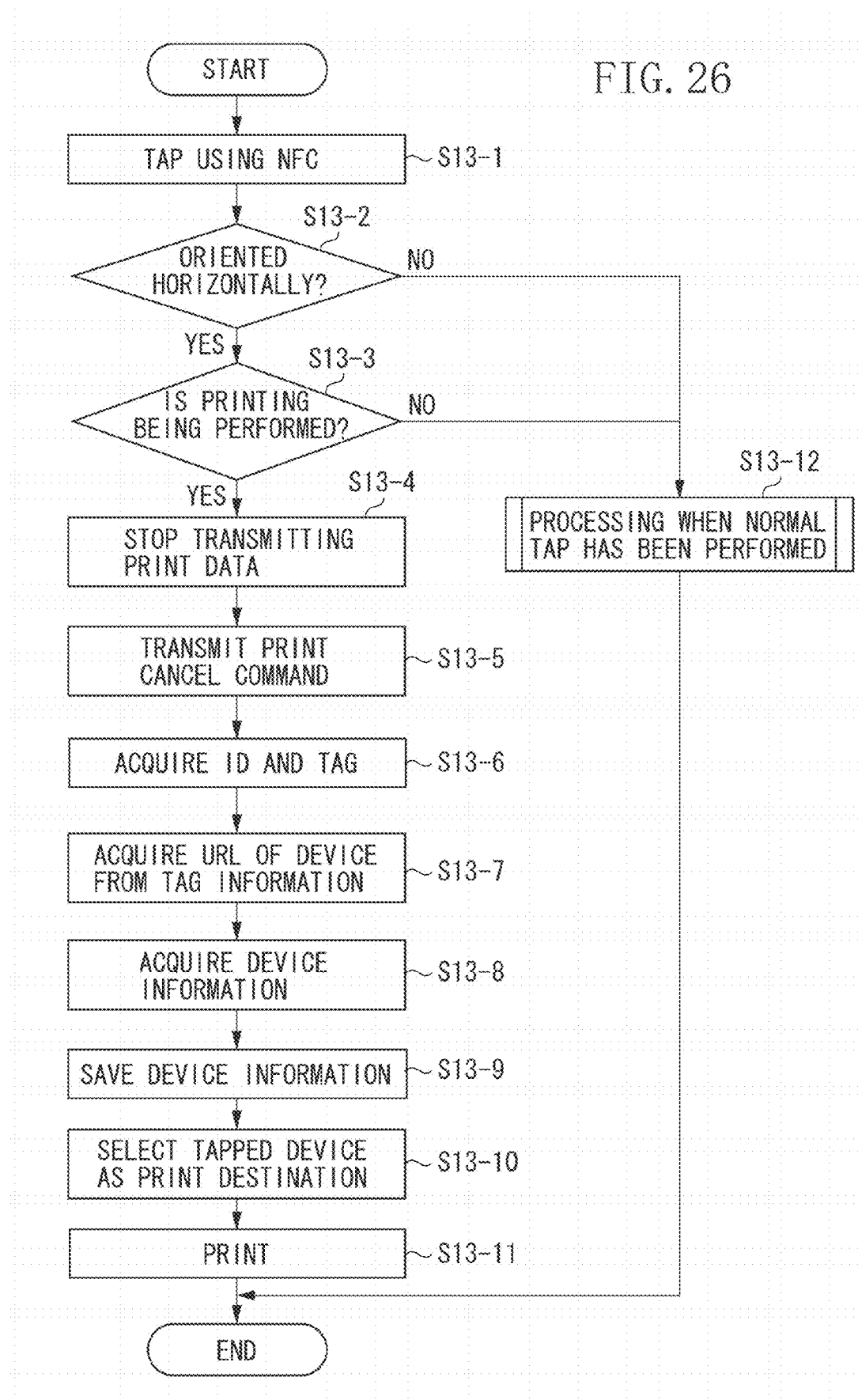

INFORMATION PROCESSING APPARATUS, STORAGE MEDIUM, AND CONTROL METHOD

BACKGROUND OF THE INVENTION

1. Field of the Invention

The present invention relates to an information processing apparatus for transmitting print data, a storage medium, and a control method.

2. Description of the Related Art

As a method of selecting an image forming apparatus when printing is performed, there is a method of performing a device search on a network using a multicast packet of the Service Location Protocol (SLP) or the multicast Domain Name System (mDNS), and selecting an image forming apparatus as a print destination from a device list of found devices.

On the other hand, as a method of selecting a device, there is also a method of selecting a device using near field communication (NFC). NFC is an international standard for passing a device over another device to perform near field communication. Devices having NFC functions are merely brought close to and held over each other to exchange various types of data.

Japanese Patent Application Laid-Open No. 2013-037687 discusses a method of employing an apparatus termed a printing pad to achieve printing using NFC, thereby enabling printing even if a printer and a mobile device are not organized on the same subnet network.

Japanese Patent Application Laid-Open No. 2013-037687, however, does not take into account the control in the case where it is possible to both select a printer using NFC and select a printer based on a device search on a network.

It is more convenient for a user if it is possible to select an image forming apparatus both using near field communication and based on a device search on a network. If, however, there are two methods of selecting an image forming apparatus, the user may be confused in determining the methods which should be used to select an image forming apparatus.

SUMMARY OF THE INVENTION

Therefore, the present specification is directed to, if it is possible to both select an image forming apparatus using near field communication and select an image forming apparatus based on a device search on a network, setting a priority on a method for selecting an image forming apparatus, thereby improving the convenience of the user.

According to an aspect of the present invention, an information processing apparatus includes:

a first selection unit configured to select an image forming apparatus by using near field communication;

a second selection unit configured to select an image forming apparatus capable of communicating by using a network; and a transmission unit configured to transmit print data to the image forming apparatus selected by the first selection unit or the second selection unit, wherein the image forming apparatus selected by the first selection unit is given preference as a print destination over the image forming apparatus selected by the second selection unit.

Further features of the present invention will become apparent from the following description of exemplary embodiments with reference to the attached drawings.

BRIEF DESCRIPTION OF THE DRAWINGS

FIG. 7B is a diagram illustrating the configuration of the printing system.

FIG. 25 is a flow chart illustrating the operation when an NFC function is forcibly turned on.

FIG. 26 is a flow chart illustrating the operation when printing is canceled.

DESCRIPTION OF THE EMBODIMENTS

Various exemplary embodiments, features, and aspects of the invention will be described in detail below with reference to the drawings.

Examples of exemplary embodiments of the present invention will be described in detail below with reference to the drawings.

Figure 1A:
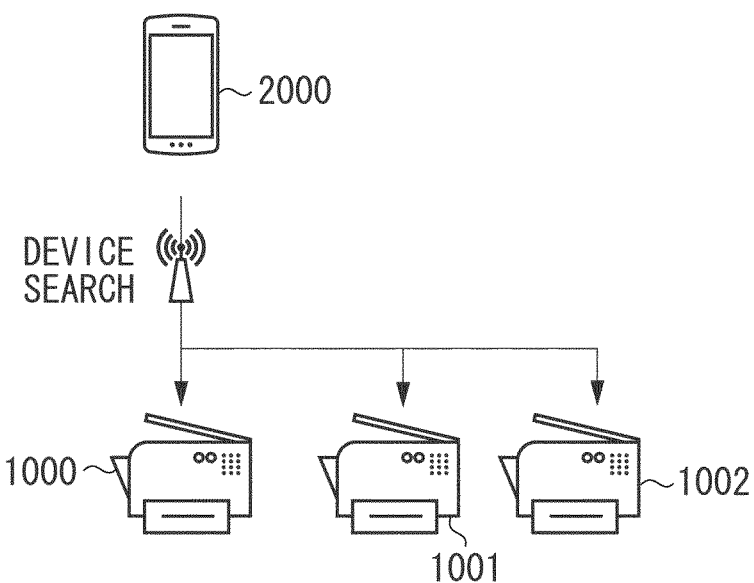
FIG. 1A illustrates a conventional device search.

First, two methods are used to select a device described in the specification. These methods are illustrated in FIGS. 1A and 1C. FIG. 1A illustrates an example of searching for devices on a network using multicast. FIG. 1C is an example of bringing a mobile terminal having an NFC function close to a device to recognize the device.

Figure 1B:
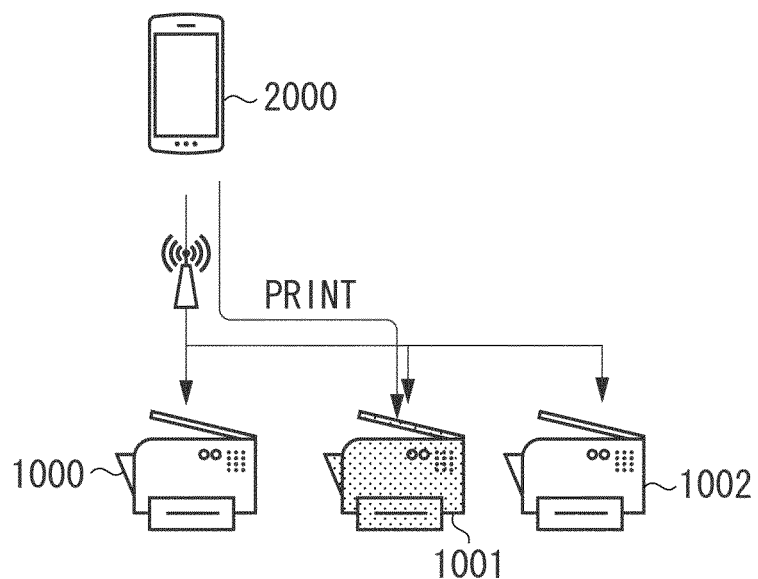
FIG. 1B illustrates the state where a selected device performs printing.
Figure 1C:
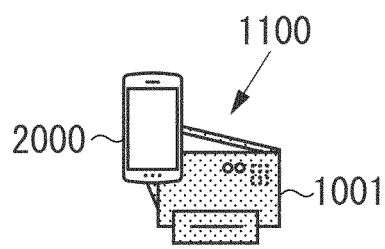
FIG. 1C illustrates the selection of a device using NFC.

After having selected a device, either the method using multicast or the method using NFC transmits print data to the target device using network communication as in FIG. 1B. If a device has been selected using NFC, print data may be transmitted to the device using NFC.

Next, the configurations of a device and a mobile terminal are described.

Figure 5:
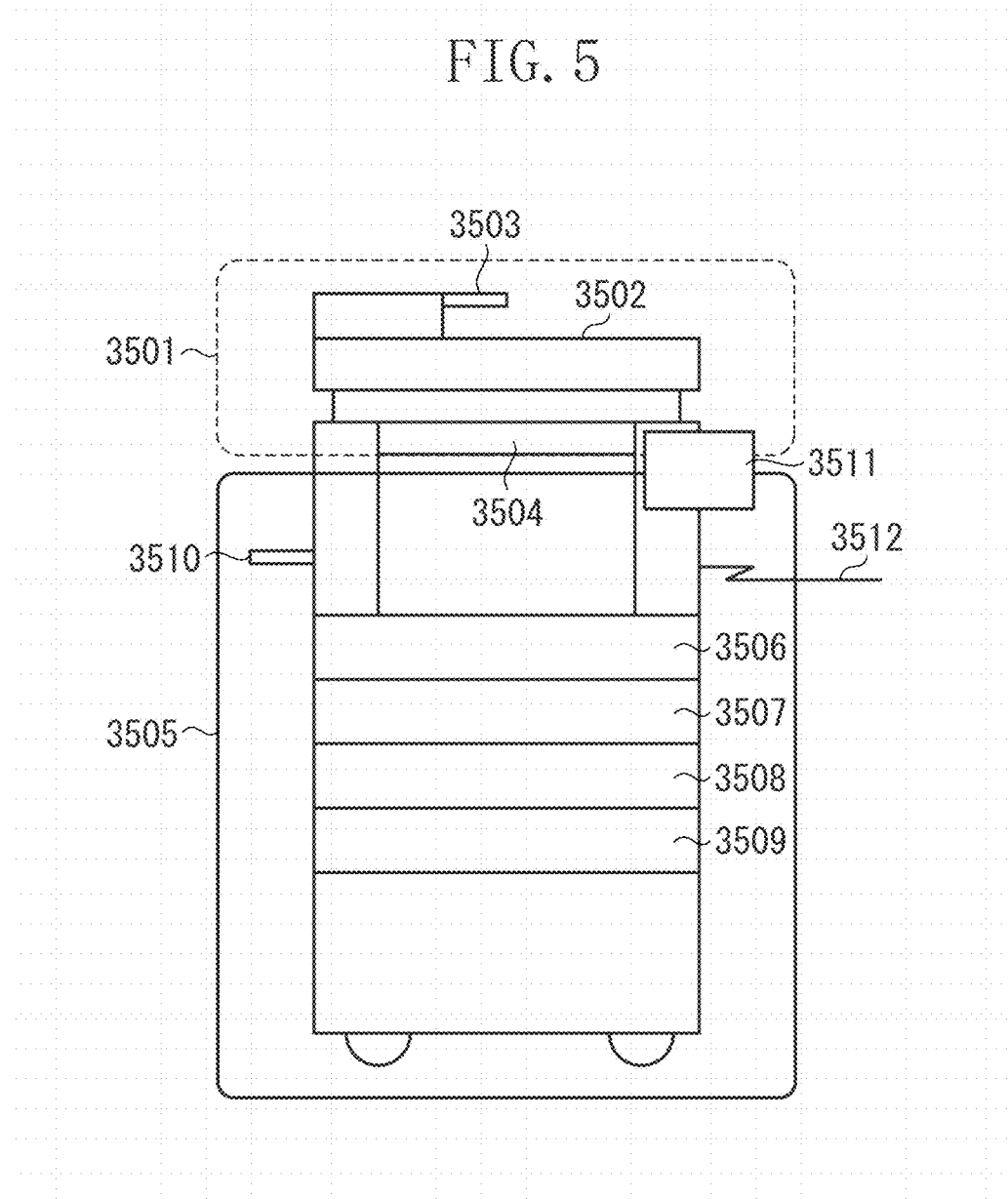
FIG. 5 illustrates a printing device.

FIG. 5 is an external view of a device 1001. The device 1001 is an example of an image forming apparatus.

A printer unit 3505, which is an image output device, converts electrical raster image data into a visible image on a sheet. Examples of this conversion method include an electrophotographic method using photosensitive drums and photosensitive belts, and an inkjet method for discharging ink from a micro-nozzle array to print an image directly on a sheet. In this case, either method may be used. A printing operation is started according to an instruction from a central processing unit (CPU) functioning as a controller. The printer unit 3505 includes a plurality of sheet feeding stages so that different sheet sizes or different sheet directions can be selected. The sheet feeding stages correspond to sheet cassettes 3506, 3507, 3508, and 3509. Further, a sheet discharge tray 3510 receives a sheet on which printing has already been performed. A short-range search unit 3511 is configured such that if a mobile terminal has been passed over the short-range search unit 3511, the mobile terminal becomes capable of communicating with an image input device. In the present exemplary embodiments, the short-range search unit 3511 that uses NFC is assumed, but the search unit is not limited to NFC. For example, the short-range search unit 3511 may use FeliCa (registered trademark), MIFARE (registered trademark), radio frequency identification (RFID), or Trancefer-Jet. A communication unit 3512 performs network communication such as Wi-Fi and Ethernet (registered trademark).

Figure 7A:
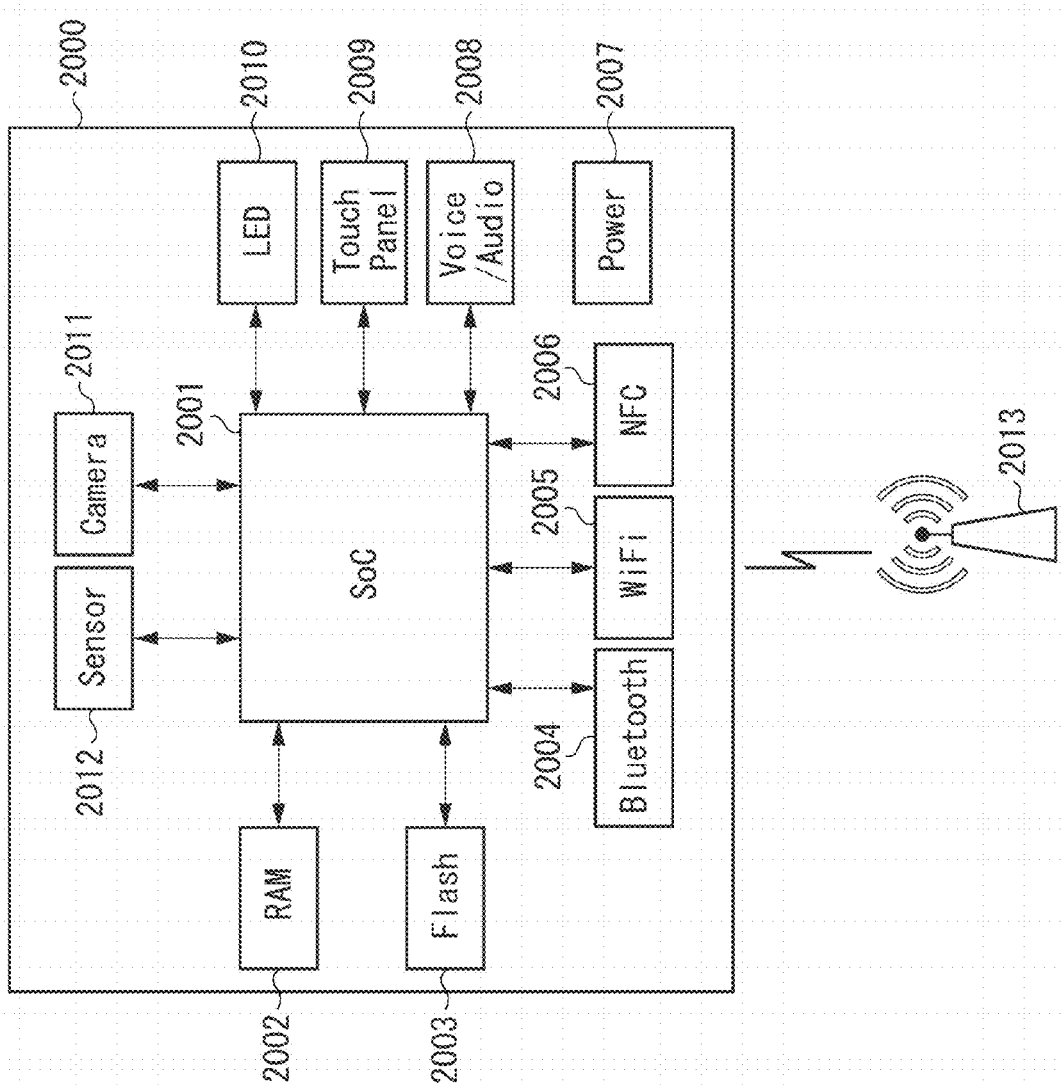
FIG. 7A illustrates the hardware configuration of the operation of a printing system.

FIG. 7A is a diagram illustrating the hardware configuration of a mobile terminal 2000. The mobile terminal 2000 is an example of an information processing apparatus.

A flash memory (flash) 2003 stores a program for a printing system 100. As the hardware, a system on a chip (SoC) 2001 executes the program, and as the software, the printing system 100 stored in the flash memory (flash) 2003 controls the program. The mobile terminal 2000 may be configured using a CPU instead of a SoC. An NFC unit 2006 performs near field communication and communicates with an NFC unit of the device 1001 in FIG. 5. A Wi-Fi unit 2005 performs wireless communication, specifically with the device 1001. The mobile terminal 2000 also includes a random-access memory (RAM) 2002, a Bluetooth (registered trademark) unit 2004, a power source 2007 of the mobile terminal 2000, a voice/audio unit 2008, which includes a microphone and a loudspeaker. The mobile terminal 2000 further includes a touch panel 2009, on which a user performs an operation with their finger, a light-emitting diode (LED) 2010, a camera unit 2011, which performs photography and videography, and a sensor unit 2012, which includes Global Positioning System (GPS) and senses acceleration, geomagnetic, and proximity. Further, a Wi-Fi access point 2013 is provided. The present exemplary embodiments assume, for example, Android (registered trademark) by Google (registered trademark) as an operating system (OS), but are not limited to such an OS.

Additionally, the SoC 2001 performs processing based on a program stored in the RAM 2002 or the flash memory 2003, thereby implementing the software configuration of the mobile terminal 2000 as illustrated in FIG. 7B and the process of each step in the flow charts described later.

FIG. 7B is a block diagram illustrating the software configuration of the printing system 100, which operates according to the mobile terminal 2000. The printing system 100 includes a device search unit 101, a device selection control unit 102, a device information acquisition unit 103, a short-range search unit 104, a rendering unit 105, a communication unit 106, a job control unit 107, a user interface (UI) unit 108, and a direction determination unit 109. Applications 110 to 112 are applications that use the printing system 100.

The device search unit 101 searches for devices using multicast. A protocol for searching for devices is SLP or multicast DNS, but is not limited to these protocols. Alternatively, broadcast may be used instead of multicast. The short-range search unit 104 determines (detects) whether or not the mobile terminal 2000 has tapped a device. The short-range search unit 104 also performs a short-range search. The "short-range search" refers to a search for a device, using near field communication (e.g., NFC). The present exemplary embodiments assume that the short-range search unit 104 uses NFC, but are not limited to such communication. The short-range search unit 104 only needs to be able to communicate with a short-range search unit of the device 1001 using near field communication. The device selection control unit 102 performs control to select a device selected by the short-range search unit 104 in priority to devices found by the device search unit 101. The device information acquisition unit 103 acquires, from a device, information about the device (hereinafter referred to as "device information"), such as the model name and the location. The rendering unit 105 performs rendering using a document generated or displayed in each of the applications 110 to 112 as print data such as a page description language (PDL) or an image that can be printed by the device 1001. The term "document" used in the present specification means an image or a document that can be opened by an application. The communication unit 106 performs network communication with the device 1001 using Wi-Fi. The job control unit 107 controls a job, such as queuing a print job. The UI unit 108 displays a user interface such as a tap screen. The direction determination unit 109 is a sensor for determining the direction of the mobile terminal 2000, such as a gyroscope or a magnetic sensor.

As the case of giving preference to a search using near field communication (e.g., NFC), which is a first search method, over a device search using a network protocol, which is a second search method, the following first exemplary embodiment is conceivable. Further, as the cases related to the first and second search methods, the following second to fourteenth exemplary embodiments are possible. These exemplary embodiments may be carried out in any combination. Alternatively, each of the exemplary embodiments may be solely carried out.

1) After a print button in an application that is displaying a document has been pressed, a screen for tapping a device using NFC is preferentially displayed (a first exemplary embodiment).

2) A device is tapped using NFC while a device list of print destinations is being displayed, thereby selecting the tapped device using NFC (a second exemplary embodiment). The device list will be described in detail in the first exemplary embodiment and thereafter.

3) If a device has been tapped while a document is being displayed, the device is selected by using NFC (a third exemplary embodiment).

4) A device is tapped using NFC, thereby selecting the device as a print destination or setting the device as a default printer in advance. When a document is printed, a device search screen is not displayed, and the device tapped in advance or the default printer prints the document (a fourth exemplary embodiment and a fifth exemplary embodiment).

5) A device is tapped while a document is being edited, thereby determining the device as a print destination in advance (a sixth exemplary embodiment).

6) If the mobile terminal 2000 has entered a particular network (e.g., a Wi-Fi guest network), a screen is displayed that indicates that if a device is tapped using NFC, it is possible to select the device that can perform printing. The device selected at this time, however, has a validity period (e.g., from an hour to a day), so that the registration of the device as a print destination is deleted from the printing system 100 when a certain time period has lapsed (a seventh exemplary embodiment).

7) If a print button has been pressed when there is no device list, a screen is displayed that indicates that if a device is tapped using NFC, it is possible to select the device that can perform printing (an eighth exemplary embodiment).

8) If a print button has been pressed when there is no online device, a screen is displayed that indicates that if a device is tapped using NFC, it is possible to select the device that can perform printing (a ninth exemplary embodiment).

9) Immediately after a print application has been started and if there is no device list, a screen is displayed that indicates that if a device is tapped using NFC, it is possible to select the device that can perform printing (a tenth exemplary embodiment).

10) Immediately after a print application has been started and if there is no device list, a screen is displayed that indicates that if a device is tapped using NFC, it is possible to select the device that can perform printing (an eleventh exemplary embodiment).

11) If an NFC function is off, the NFC function is forcibly turned on so that it is possible to select a device using NFC (a twelfth exemplary embodiment).

12) If a device has been tapped with the mobile terminal 2000 oriented horizontally, a printing job being performed is canceled, and the tapped device performs printing (a thirteenth exemplary embodiment).

13) If a device has been tapped with the mobile terminal 2000 upside down, the registration of the device is deleted (a fourteenth exemplary embodiment).

14) Even if a device found in a device search using a network protocol has been selected from a device list as a print destination, a device is selected using NFC within a certain time period from among the found devices, thereby determining as a print destination the device selected using NFC (a fifteenth exemplary embodiment).

The term "tapping" used in each case is described.

In the present specification, the process of bringing components in near field communication so close to each other that the components can communicate with each other is described as "tapping". That is, the NFC unit 2006 of the mobile terminal 2000 is brought so close to another NFC unit of a device that both NFC units can communicate with each other. In this case, the device to be tapped is connected to a network and is assigned an address (a uniform resource locator (URL)) on the network.

An example of each case is described below. A flow chart in each case is implemented by the printing system 100 of the mobile terminal 2000 or an application of the mobile terminal 2000.

Figure 8:
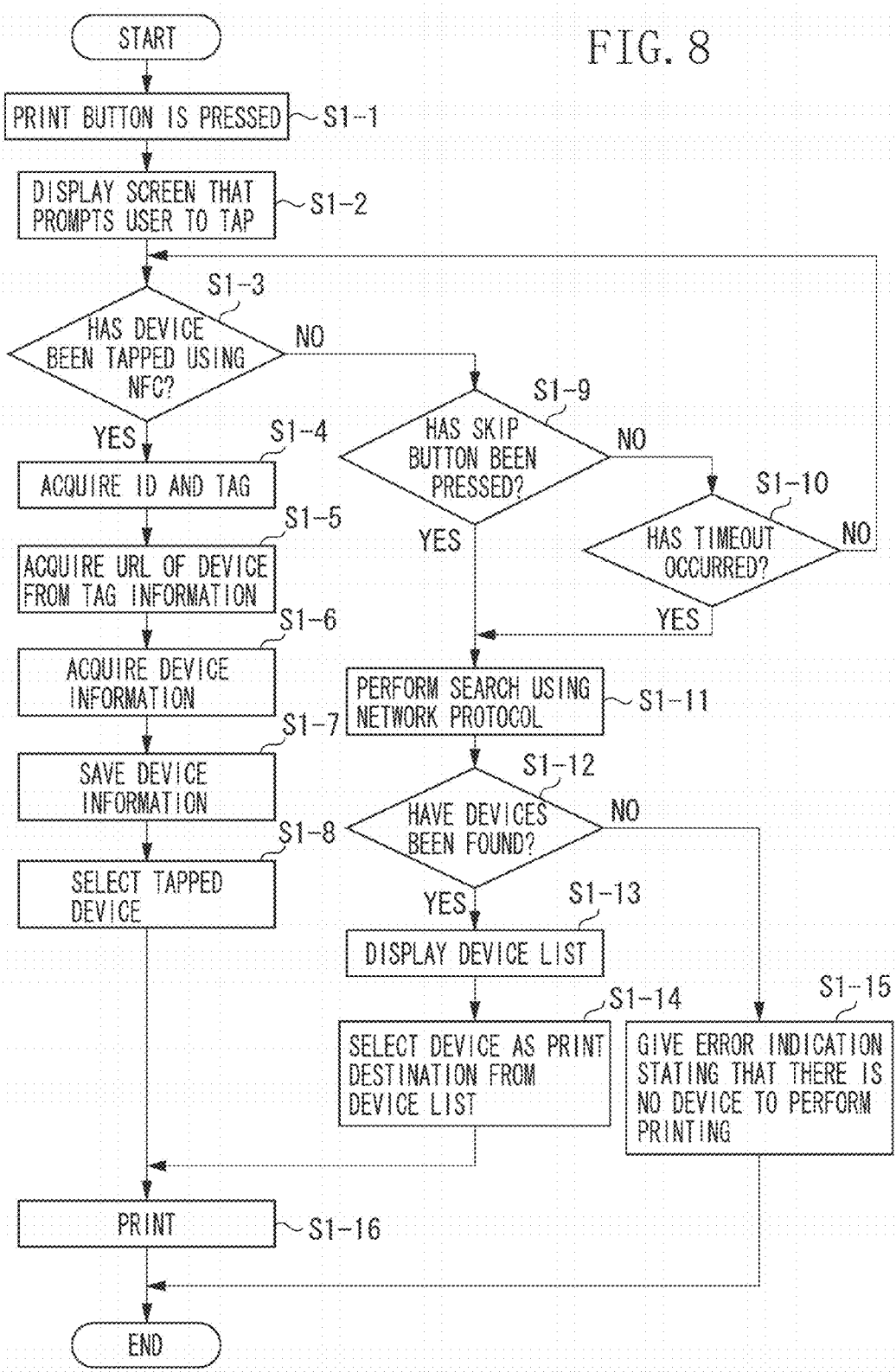
FIG. 8 is a flow chart illustrating the operation when a print button is pressed.

The first exemplary embodiment is described below. FIG. 8 is a flow chart illustrating an example of the case where, after a print button of an application that is displaying a document has been pressed, a screen for tapping a device using NFC is preferentially displayed.

Figure 9:
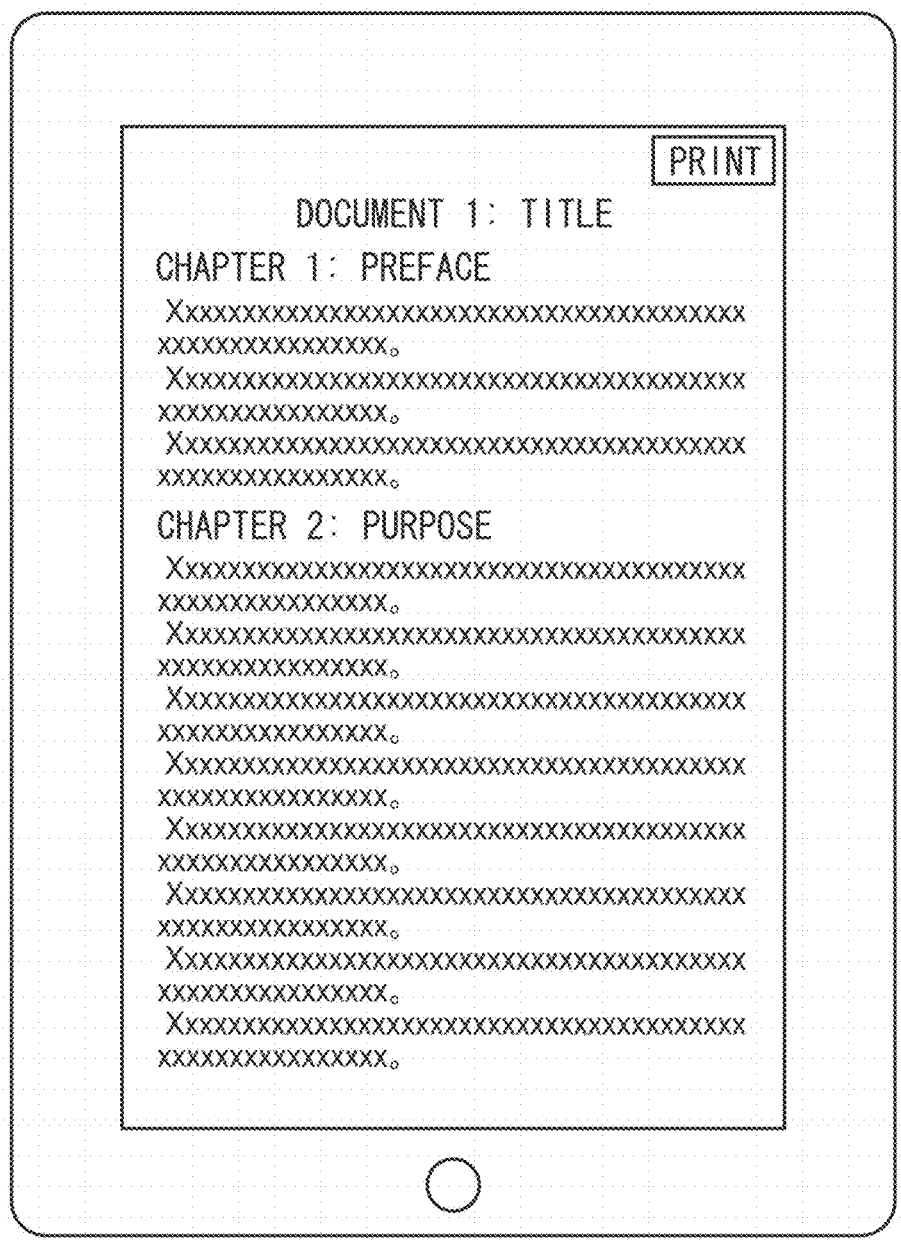
FIG. 9 illustrates a UI 1 when the print button is pressed.
Figure 10:
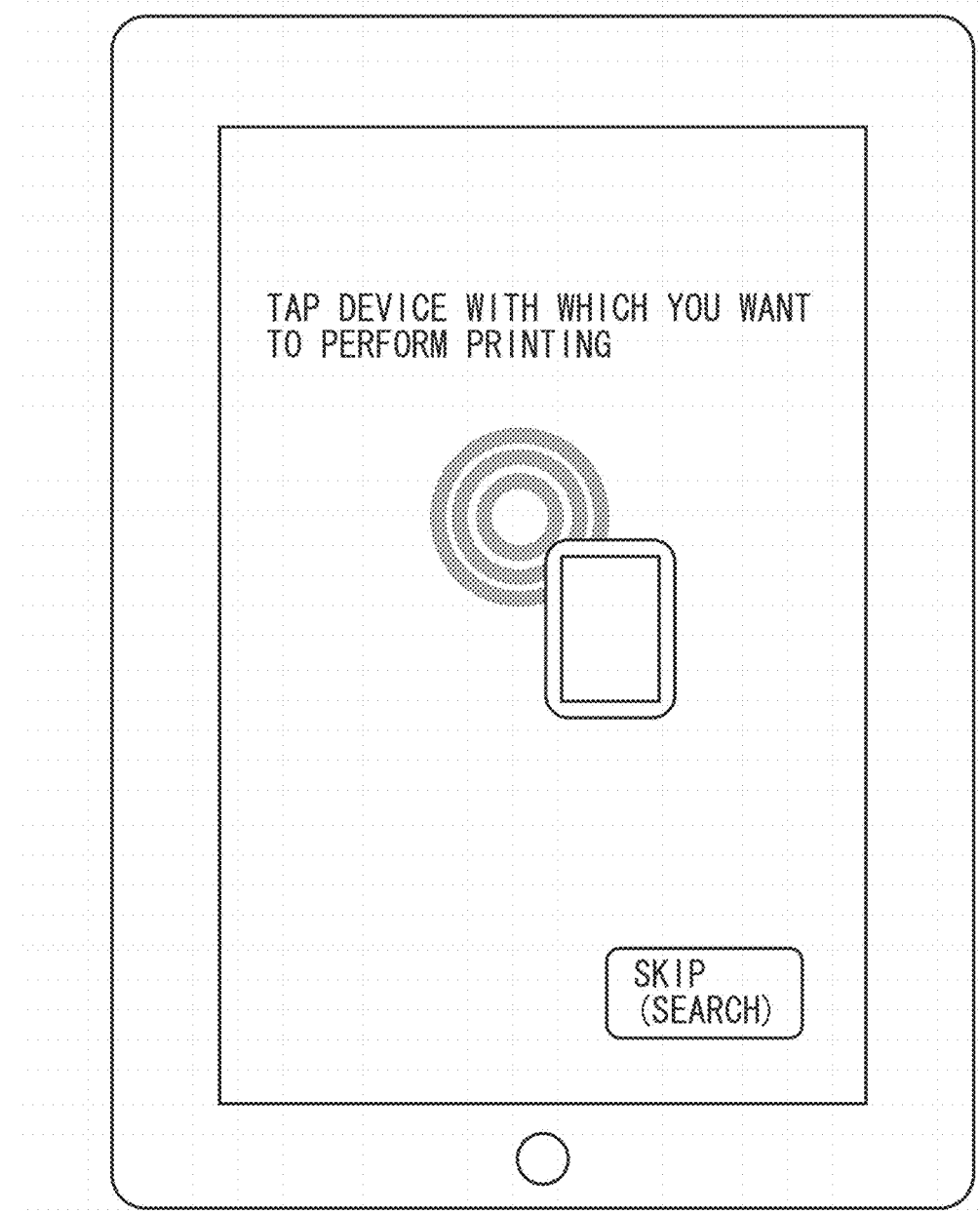
FIG. 10 illustrates a UI 2 when the print button is pressed.

In step S1-1, a print button of the application that is displaying a document is pressed (FIG. 9). In step S1-2, the printing system 100 displays a tap screen, which prompts the user to tap a device using NFC (FIG. 10). While the screen in FIG. 10 is being displayed, the printing system 100 does not accept the selection of a device made by the second search method. In this case, the present invention assumes NFC as near field communication, but is not limited to NFC. In step S1-3, the printing system 100 determines whether or not a device has been tapped using NFC. If a device has been tapped (YES in step S1-3), then in step S1-4, the printing system 100 acquires information about the identification (ID) and the tag of the NFC unit.

The ID of an NFC unit is a unique identifier that is recorded in an NFC chip and cannot be rewritten. The tag of an NFC unit is data encoded in NFC Data Exchange Format, which is a message format specified by the NFC Forum Type 2 Tag Operation Specification.

In step S1-5, the printing system 100 acquires the URL of the device from the tag information. In step S1-6, the printing system 100 acquires the device information using the acquired URL. In step S1-7, the printing system 100 saves the acquired device information. In step S1-8, the printing system 100 selects the tapped device as a print destination. In step S1-16, the printing system 100 transmits print data to the selected device, thereby performing printing. If, on the other hand, a device has not been tapped (NO in step S1-3), then in step S1-9, the printing system 100 determines whether or not a skip button has been pressed. If the skip button has not been pressed (NO in step S1-9), the processing proceeds to step S1-10. In step S1-10, the printing system 100 determines whether or not a timeout has occurred. If a timeout has occurred in step S1-10 (YES in step S1-10), or if the skip button has been pressed in step S1-9 (YES in step S1-9), then in step S1-11, the printing system 100 performs a device search using a network protocol by the second search method. In step S1-12, the printing system 100 determines whether or not devices have been found. If devices have been found (YES in step S1-12), then in step S1-13, the printing system 100 displays a device list.

The term "device list" used in the specification means a list of devices that can be selected as a print destination by the user. The device list according to the present exemplary embodiment is a list of devices including at least devices found in a device search using a network protocol, or a device registered by the user among devices found in a device search using a network protocol or found in near field communication. The method of registering a device using a network protocol is a method used by Windows (registered trademark) and therefore is not described here. The details of the method of registering a device found in near field communication will be described in the fourth exemplary embodiment and thereafter.

If devices have not been found in step S1-12 (NO in step S1-12), then in step S1-15, the printing system 100 gives an error indication stating that there is no device to perform printing. In step S1-14, the printing system 100 selects a device as a print destination from the device list. Then, in step S1-16, the printing system 100 transmits print data to the selected device, thereby performing printing.

This prevents display of a screen for selecting another device, such as a search screen for a device search using a network protocol by the second search method, which confuses the user when performing an operation. This can provide a smooth printing operation.

Figure 11:
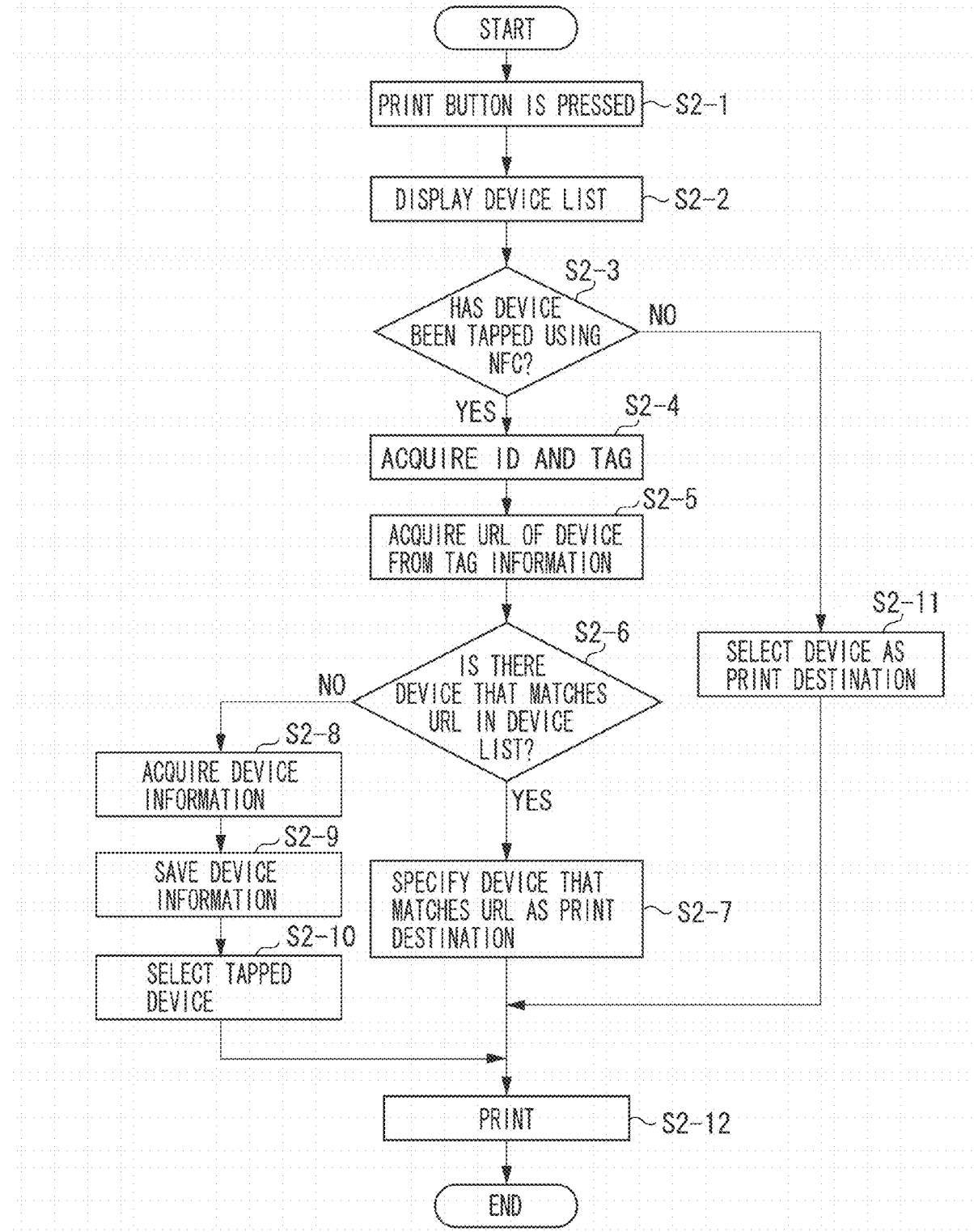
FIG. 11 is a flow chart illustrating the operation when a device list is displayed.

The second exemplary embodiment is described below. FIG. 11 is a flow chart illustrating an example of the case where a device is tapped using NFC while a device list of print destinations is being displayed, thereby selecting the tapped device using NFC.

Figure 2:
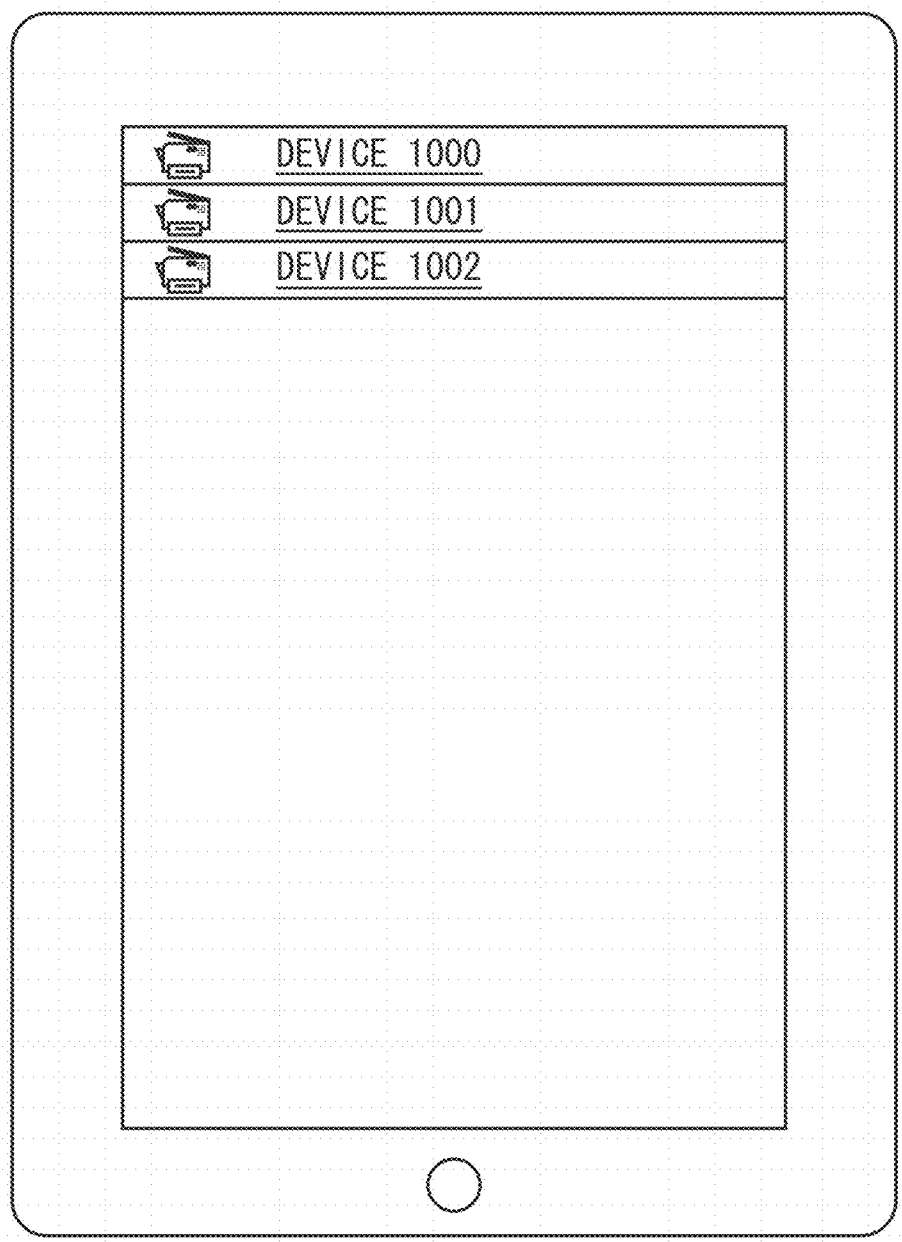
FIG. 2 illustrates a device selection screen after a device search.
Figure 12:
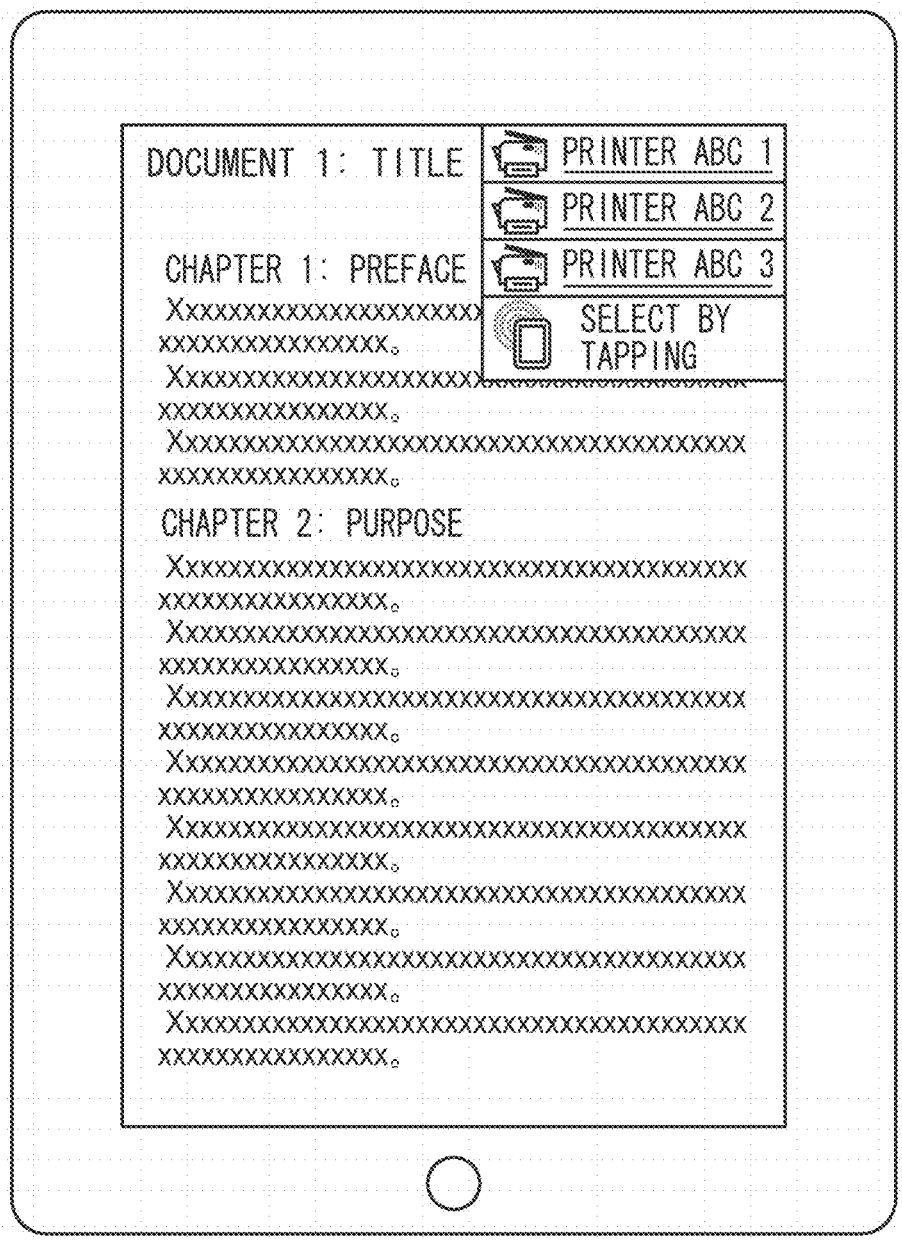
FIG. 12 illustrates a UI when the device list is displayed.

In step S2-1, a print button in an application that is displaying a document is pressed. In step S2-2, the printing system 100 displays a device list. FIG. 12 is an example of a screen that is displaying the device list. The screen may also be displayed as in FIG. 2. At this time, the device list according to the present exemplary embodiment may include devices found in a device search using a network protocol, or a device registered in advance such as a default printer, which will be described later in the fourth exemplary embodiment and thereafter, or the device list may include both of these devices. In step S2-3, the printing system 100 determines whether or not a device has been tapped using NFC while the device list is being displayed. To tap a device using NFC while the device list is being displayed, it is not necessary to perform any operation on the screen of the mobile terminal 2000. If a device has been tapped in step S2-3 (YES in step S2-3), then in step S2-4, the printing system 100 acquires information about the ID and the tag of the NFC unit. In step S2-5, the printing system 100 acquires the URL of the device from the tag information. In step S2-6, the printing system 100 determines whether or not there is a device that matches the acquired URL in the device list. If there is a device that matches the acquired URL (YES in step S2-6), then in step S2-7, the printing system 100 specifies as a print destination the device that matches the acquired URL. If there is no device that matches the acquired URL (NO in step S2-6), then in step S2-8, the printing system 100 acquires the device information from the tapped device. In step S2-9, the printing system 100 saves the acquired device information. In step S2-10, the printing system 100 selects the tapped device as a print destination.

If a device has not been tapped using NFC while the device list is being displayed in step S2-3 (NO in step S2-3), then in step S2-11, the user selects a device as a print destination from the device list.

Finally, in step S2-12, the printing system 100 transmits print data of a document to the device selected as the print destination, thereby performing printing.

Figure 13:
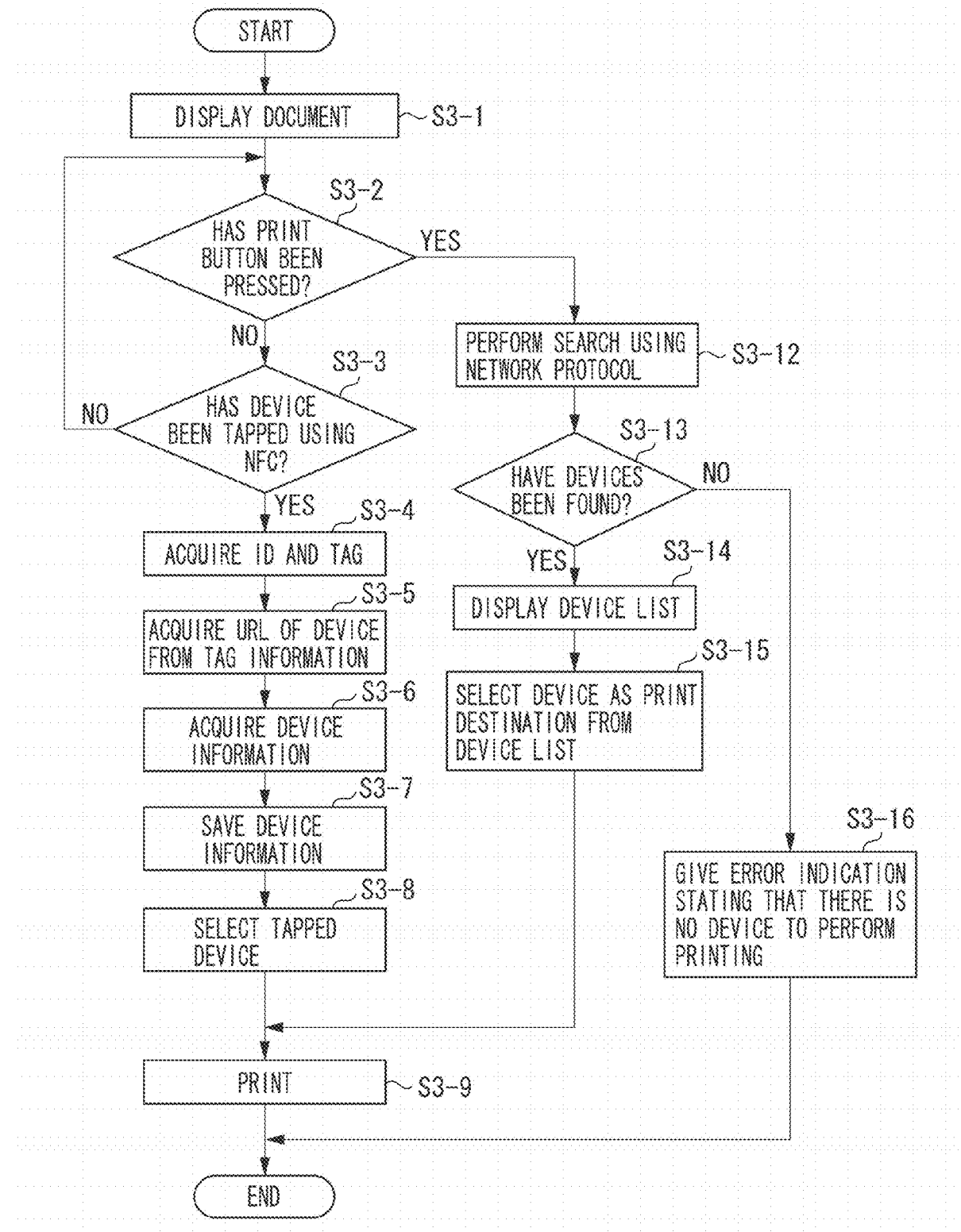
FIG. 13 is a flow chart illustrating the operation when a document is displayed.

The third exemplary embodiment is described below. FIG. 13 is a flow chart illustrating an example of the case where, if a device has been tapped while a document is being displayed (FIG. 9), the device is selected using NFC.

In step S3-1, an application displays a document. In step S3-2, the printing system 100 determines whether or not a print button has been pressed. If the print button has not been pressed (NO in step S3-2), then in step S3-3, the printing system 100 determines whether or not a device has been tapped using NFC. If a device has been tapped (YES in step S3-3), then in step S3-4, the printing system 100 acquires information about the ID and the tag of the NFC unit. In step S3-5, the printing system 100 acquires the URL of the device from the tag information. In step S3-6, the printing system 100 acquires the device information using the acquired URL. In step S3-7, the printing system 100 saves the acquired device information. In step S3-8, the printing system 100 selects the tapped device as a print destination. In step S3-9, the printing system 100 transmits print data to the selected device, thereby performing printing. If, on the other hand, the print button has been pressed in step S3-2 (YES in step S3-2), then in step S3-12, the printing system 100 performs a device search using a network protocol by the second search method. In step S3-13, the printing system 100 determines whether or not devices have been found. If devices have been found (YES in step S3-13), then in step S3-14, the printing system 100 displays a device list. If devices have not been found (NO in step S3-13), then in step S3-16, the printing system 100 gives an error indication stating that there is no device to perform printing. In step S3-15, the printing system 100 selects a device as a print destination from the device list. Then, in step S3-9, the printing system 100 transmits print data based on the currently displayed document to the selected device, thereby performing printing.

Figure 14:
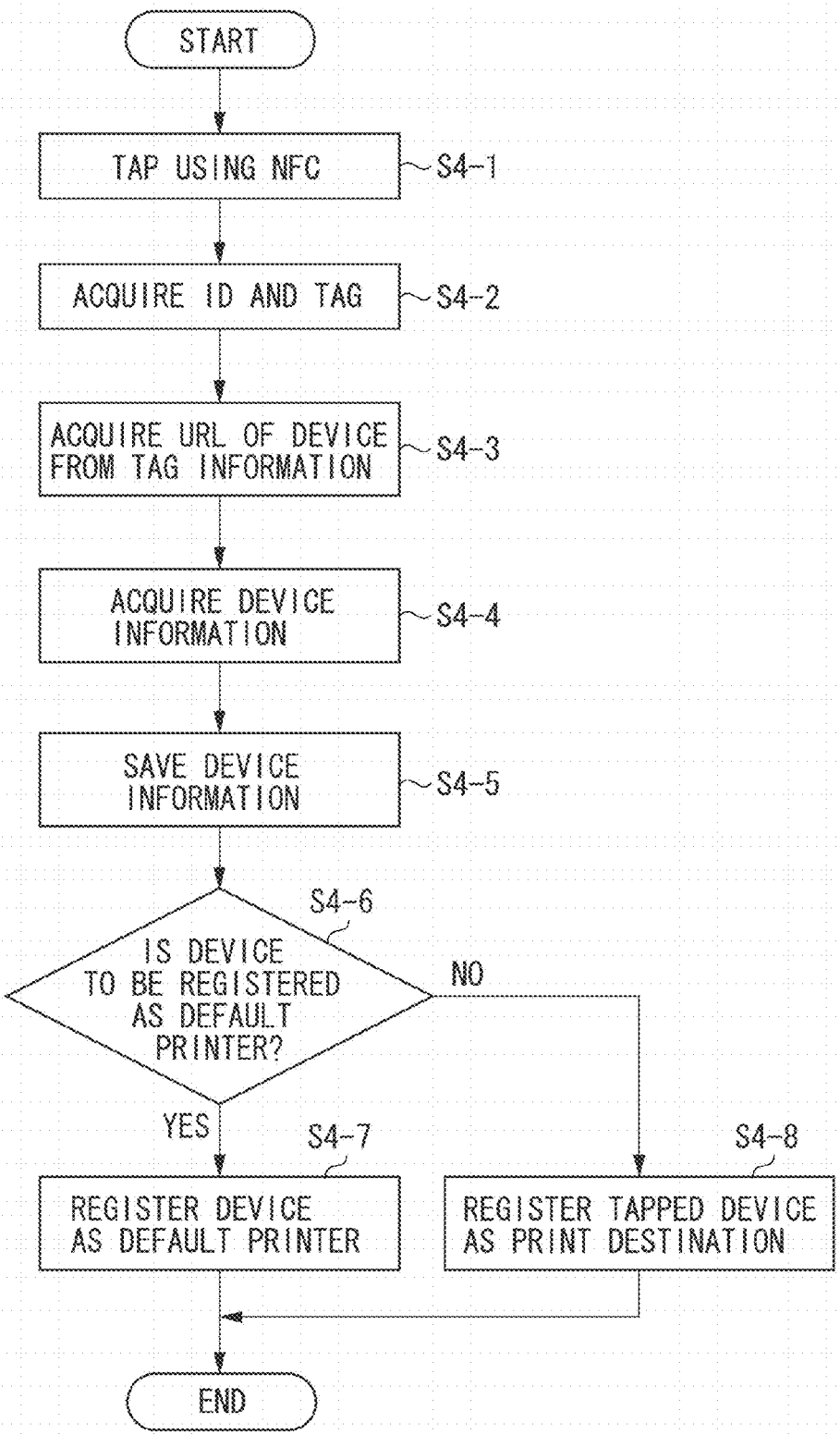
FIG. 14 is a flow chart 1 illustrating the operation of selecting a device in advance.

The fourth exemplary embodiment is described below. FIG. 14 is a flow chart illustrating an example of the case where a device is tapped using NFC, thereby registering the device as a default printer or a destination printer in advance. The term "in advance" used here means registering (selecting) a print destination in advance before giving a print instruction.

Figure 17:
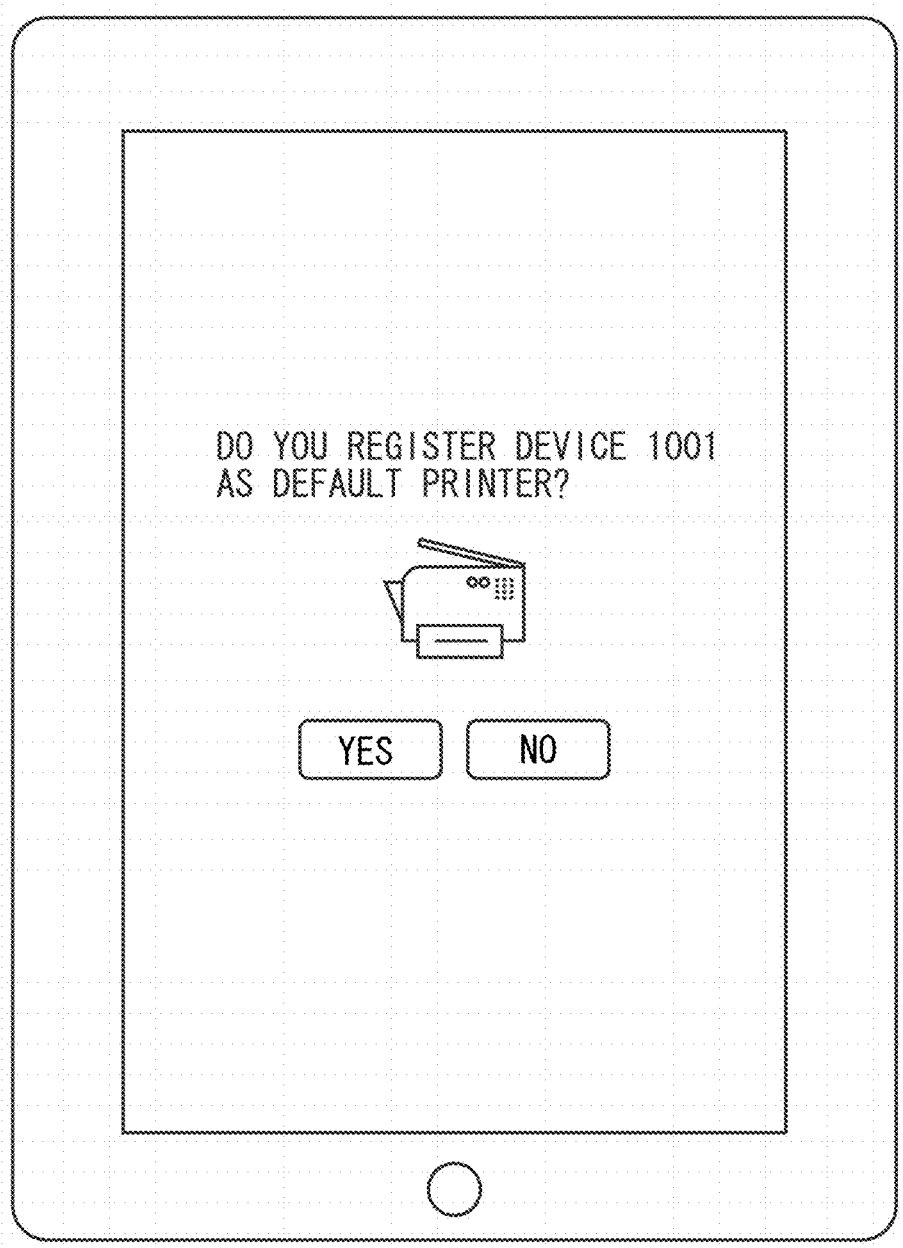
FIG. 17 illustrates a default printer registration screen.

In step S4-1, the printing system 100 detects a tap on a device using NFC. In step S4-2, the printing system 100 acquires information about the ID and the tag of the NFC unit. In step S4-3, the printing system 100 acquires the URL of the device from the tag information. In step S4-4, the printing system 100 acquires the device information using the acquired URL. In step S4-5, the printing system 100 saves the acquired device information. In step S4-6, the printing system 100 confirms whether or not the device is to be registered as a default printer. FIG. 17 illustrates an example of a screen for confirming whether or not the device is to be registered as a default printer. If the device is to be registered (YES in step S4-6), then in step S4-7, the printing system 100 registers the device as a default printer. If the device is not to be registered (NO in step S4-6), then in step S4-8, the printing system 100 registers the tapped device as a next print destination in a device list.

Figure 18:
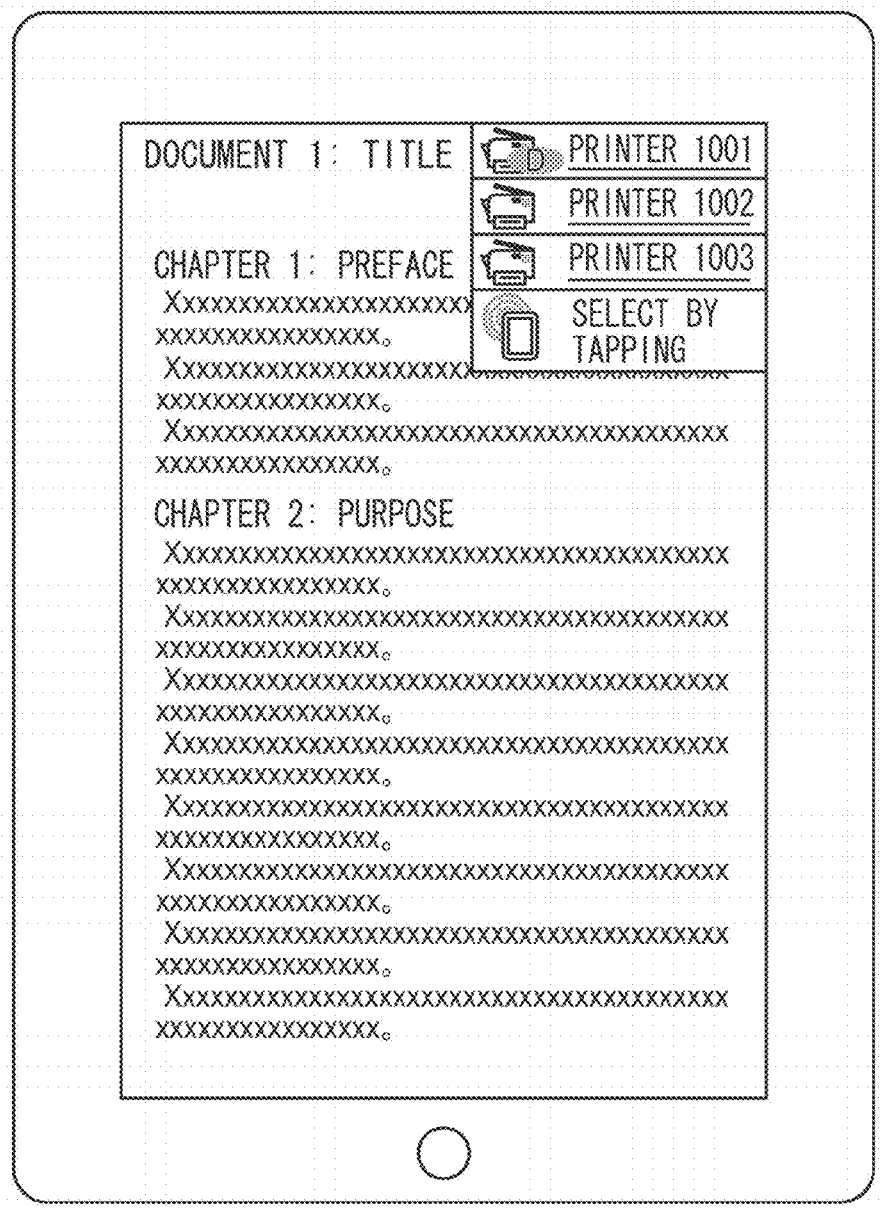
FIG. 18 illustrates a default printer display screen.

FIG. 18 is a diagram illustrating an example of a screen that displays the device registered as the default printer in a device list. The mark "D" displayed on an icon of the device 1001 indicates that the device 1001 is the default printer. In FIG. 18, devices other than the default printer are also displayed in the device list. Alternatively, the screen may be configured such that a combo box is displayed, and the default value of the combo box is set to the default printer, thereby displaying only the default printer.

Figure 15:
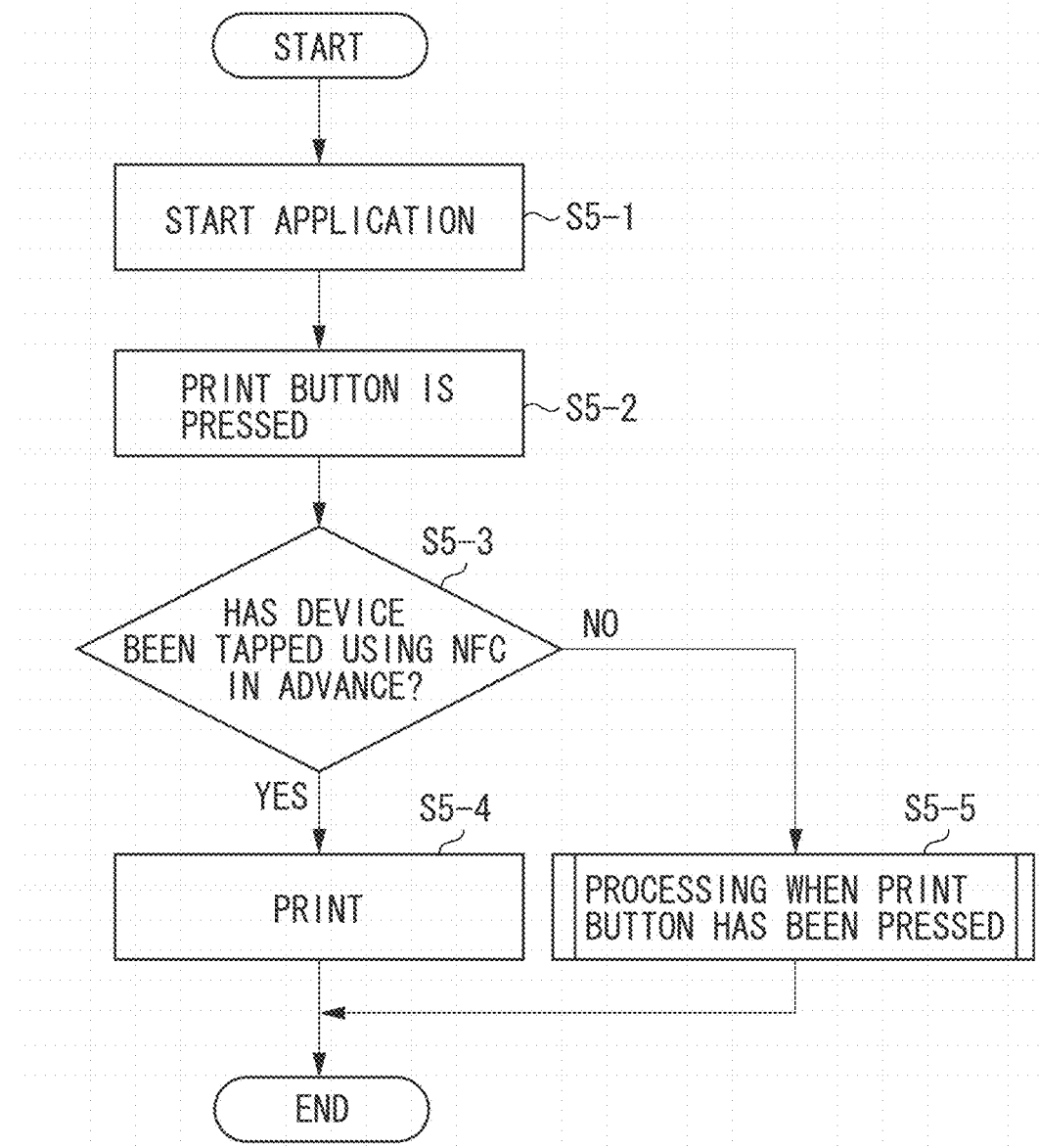
FIG. 15 is a flow chart 2 illustrating the operation of selecting a device in advance.

The fifth exemplary embodiment is described below. FIG. 15 is a flow chart illustrating an example of the case where a device registered in advance prints a document.

In step S5-1, an application is started. In step S5-2, a print button is pressed. In step S5-3, the printing system 100 determines whether or not a device has been tapped using NFC in advance and then registered as a print destination in step S4-8 or registered as a default printer in step S4-7. If a device has been registered (YES in step S5-3), then in step S5-4, the printing system 100 transmits print data to the selected device, thereby performing printing. The configuration may be such that if a default printer has been registered, the printing system 100 does not accept the selection of a device made by the second search method. If, on the other hand, a device has not been registered (NO in step S5-3), then in step S5-5, the printing system 100 performs the processing when a print button is pressed. The processing performed when a print button is pressed is similar to the flow chart in FIG. 8.

Figure 16:
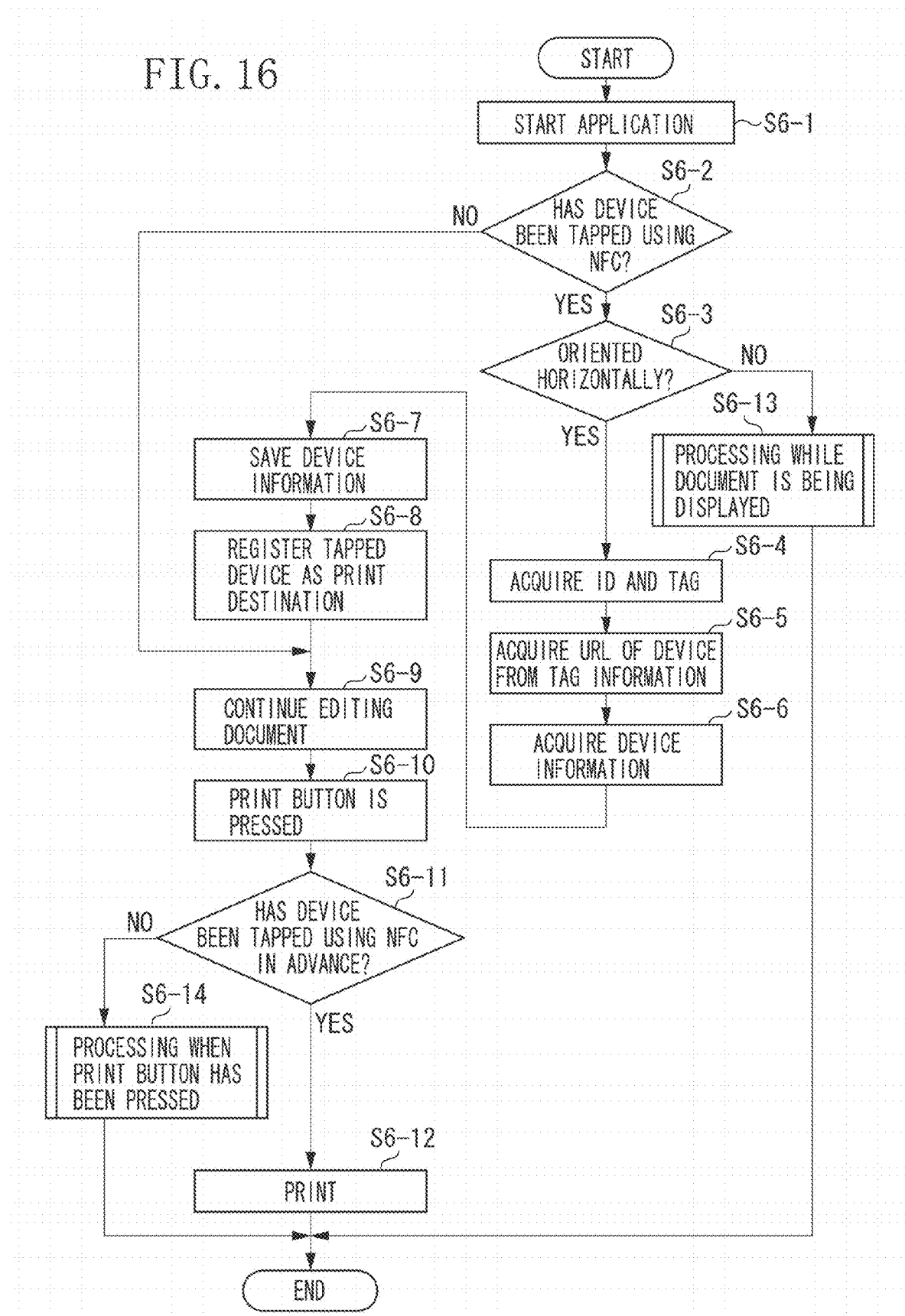
FIG. 16 is a flow chart illustrating the operation of selecting a device while a document is being edited.

The sixth exemplary embodiment is described below. FIG. 16 is a flow chart illustrating an example of the case where a device is tapped using NFC while a document is being edited, thereby selecting the device as a print destination in advance.

In step S6-1, a document editing application is started. In step S6-2, the printing system 100 determines whether or not a device has been tapped using NFC. If a device has been tapped (YES in step S6-2), then in step S6-3, the printing system 100 determines, using the direction determination unit 109 of the mobile terminal 2000, whether or not the mobile terminal 2000 is oriented horizontally. If the mobile terminal 2000 is oriented horizontally (YES in step S6-3), then in step S6-4, the printing system 100 acquires information about the ID and the tag of the NFC unit. If the mobile terminal 2000 is not oriented horizontally (is oriented vertically) (NO in step S6-3), then in step S6-13, the printing system 100 performs the processing while a document is being displayed. The processing while a document is being displayed is similar to the flow chart in FIG. 13. In step S6-5, the printing system 100 acquires the URL of the device from the tag information. In step S6-6, the printing system 100 acquires the device information using the acquired URL. In step S6-7, the printing system 100 saves the acquired device information. In step S6-8, the printing system 100 registers the tapped device as a print destination. After the registration in step S6-8, or if a device has not been tapped in step S6-2 (NO in step S6-2), then in step S6-9, the processing returns to the document editing application, and the document editing operation is continued. In step S6-10, a print button is pressed. In step S6-11, the printing system 100 determines whether or not a device has been tapped using NFC in advance and then registered as a print destination. If a device has been registered as a print destination (YES in step S6-11), then in step S6-12, the printing system 100 transmits print data to the selected device, thereby performing printing. If, on the other hand, a device has not been registered as a print destination (NO in step S6-11), then in step S6-14, the printing system 100 performs the processing when a print button is pressed. The processing when a print button is pressed is similar to the flow chart in FIG. 8.

The present exemplary embodiment has been described taking a document editing application as an example. Alternatively, the application may be an image editing application.

Further, in the present exemplary embodiment, an example has been illustrated where control is switched based on whether the mobile terminal 2000 is oriented vertically or horizontally. It is, however, only necessary to determine whether or not the mobile terminal 2000 has a particular inclination. For example, control may be switched based on the determination of whether or not a device has been tapped with the mobile terminal 2000 upside down.

Figure 19:
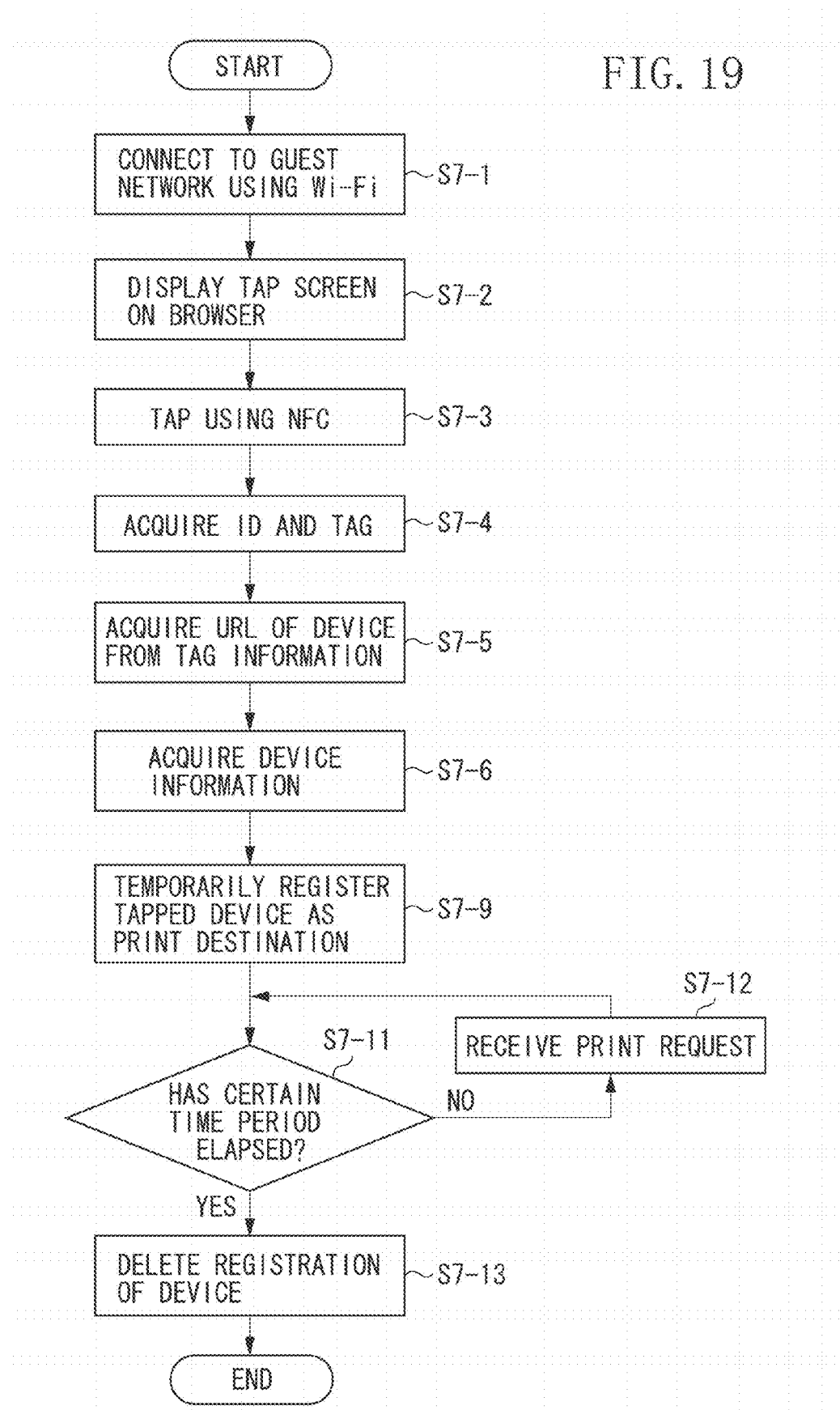
FIG. 19 is a flow chart illustrating the operation when a mobile terminal has entered a guest network.

The seventh exemplary embodiment is described below. FIG. 19 is a flow chart illustrating the operation when the mobile terminal 2000 has connected to a particular network (e.g., a Wi-Fi guest network). If the mobile terminal 2000 has connected to a Wi-Fi guest network, a screen is displayed on a browser to indicate that if a device is tapped using NFC, it is possible to select the device as a device that can perform printing. The device registered at this time, however, has a validity period (e.g., from an hour to a day) so that the registration of the device as a print destination is deleted from a device list when a certain time period has elapsed.

Figure 20:
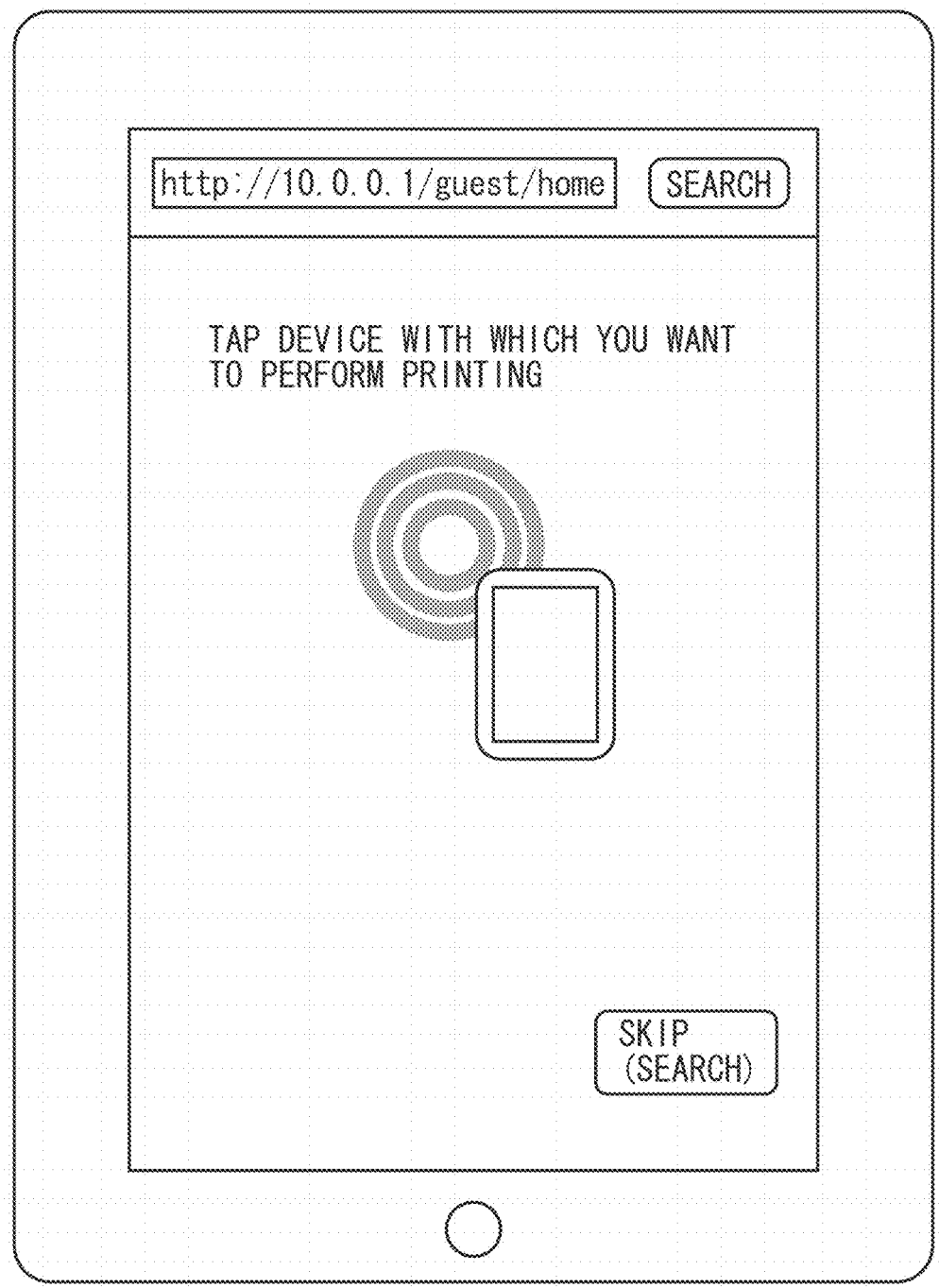
FIG. 20 illustrates a tap screen, which prompts a user to tap a device on a browser.

In step S7-1, the mobile terminal 2000 connects to a Wi-Fi guest network. If the mobile terminal 2000 has succeeded in connecting to the guest network, then in step S7-2, the printing system 100 displays on a browser a tap screen, which prompts the user to tap a device (FIG. 20). If a skip button has been pressed in FIG. 20, the processing ends without performing step S7-3 and thereafter. In step S7-3, a device is tapped using NFC. In step S7-4, the printing system 100 acquires information about the ID and the tag of the NFC unit. In step S7-5, the printing system 100 acquires the URL of the device from the tag information. In step S7-6, the printing system 100 acquires the device information using the acquired URL. In step S7-9, the printing system 100 temporarily registers the tapped device as a print destination in a device list. In step S7-11, the printing system 100 determines whether or not a certain time period has elapsed. This time period depends on the policy that allows the use of a printer on the guest network. This time period is a certain time period such as two hours or seven hours. If the certain time period has not elapsed (NO in step S7-11), then in step S7-12, the printing system 100 waits to receive a print request. If the certain time period has elapsed (YES in step S7-11), then in step S7-13, the printing system 100 deletes the registered device from the device list.

Figure 21:
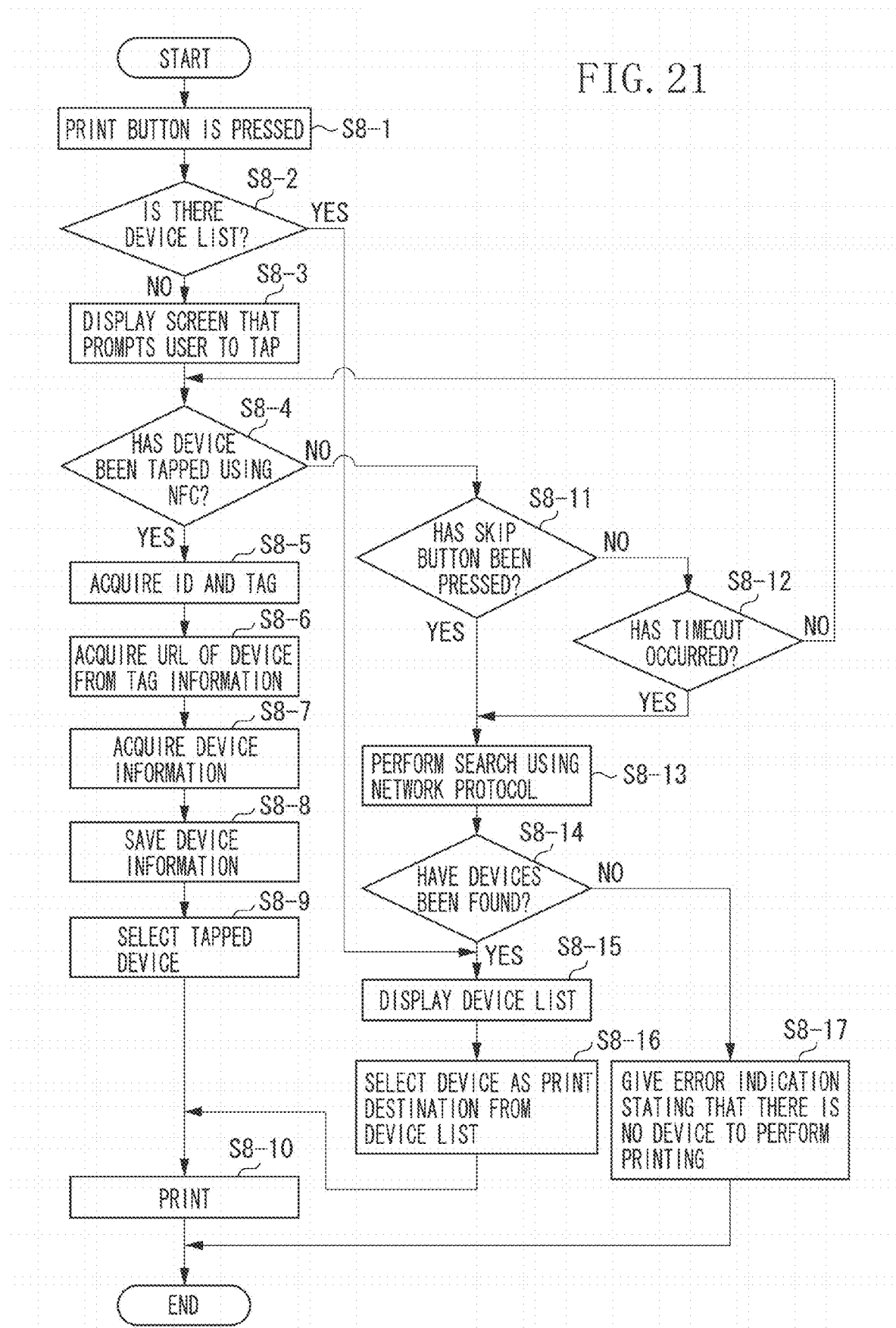
FIG. 21 is a flow chart illustrating the operation when a print button has been pressed and there is no device list.

The eighth exemplary embodiment is described below. FIG. 21 is a flow chart illustrating the operation in the case where a print button has been pressed when there is no device list. The case where there is no device list means, specifically, the case where a device search using a network protocol by the second search method has never been performed before, or the case where there is no device registered as a default printer or a print destination in a device list.

In step S8-1, a print button in an application that is displaying a document is pressed. In step S8-2, the printing system 100 determines whether or not there is a device list in which devices are registered. If there is no device list (NO in step S8-2), then in step S8-3, the printing system 100 displays a tap screen, which prompts the user to tap a device using NFC (FIG. 10). If there is a device list (YES in step S8-2), the processing proceeds to step S8-15. In step S8-15, the printing system 100 displays the device list. In step S8-4, the printing system 100 determines whether or not a device has been tapped using NFC. If a device has been tapped (YES in step S8-4), then in step S8-5, the printing system 100 acquires information about the ID and the tag of the NFC unit. In step S8-6, the printing system 100 acquires the URL of the device from the tag information. In step S8-7, the printing system 100 acquires the device information using the acquired URL. In step S8-8, the printing system 100 saves the acquired device information. In step S8-9, the printing system 100 selects the tapped device as a print destination. In step S8-10, the printing system 100 transmits print data to the selected device, thereby performing printing. If, on the other hand, a device has not been tapped (NO in step S8-4), then in step S8-11, the printing system 100 determines whether or not a skip button has been pressed. If the skip button has not been pressed (NO in step S8-11), the processing proceeds to step S8-12. In step S8-12, the printing system 100 determines whether or not a timeout has occurred. If a timeout has occurred in step S8-12 (YES in step S8-12), or if the skip button has been pressed in step S8-11 (YES in step S8-11), then in step S8-13, the printing system 100 performs a device search using a network protocol by the second search method. In step S8-14, the printing system 100 determines whether or not devices have been found. If devices have been found (YES in step S8-14), then in step S8-15, the printing system 100 displays a device list. In step S8-16, the printing system 100 selects a device as a print destination from the device list. Then, in step S8-10, the printing system 100 transmits print data to the selected device, thereby performing printing. If devices have not been found in step S8-14 (NO in step S8-14), then in step S8-17, the printing system 100 gives an error indication stating that there is no device to perform printing.

Figure 22:
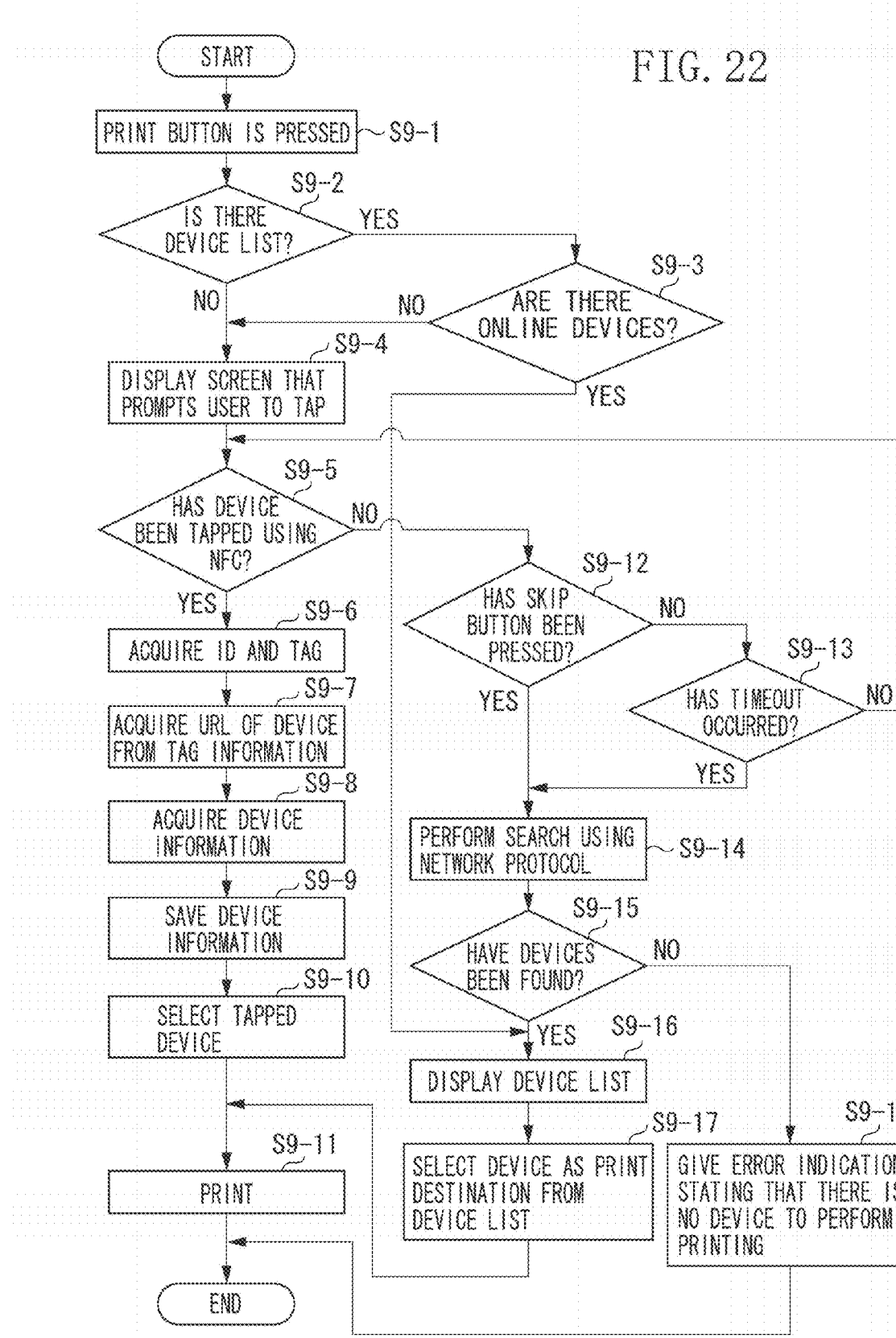
FIG. 22 is a flow chart illustrating the operation when a print button has been pressed and there is no device list of online devices.

The ninth exemplary embodiment is described below. FIG. 22 is a flow chart illustrating the operation in the case where a print button has been pressed when there is no online device. The confirmation of whether or not there are online devices is, for example, made by accessing devices in a device list, or made based on whether or not devices in a device list have been found in a device search using a network protocol by the second search method.

In step S9-1, a print button in an application that is displaying a document is pressed. In step S9-2, the printing system 100 determines whether or not there is a device list in which devices are registered. If there is no device list (NO in step S9-2), then in step S9-4, the printing system 100 displays a tap screen, which prompts the user to tap a device using NFC (FIG. 10). If there is a device list (YES in step S9-2), then in step S9-3, the printing system 100 determines whether or not there are online devices in the device list. If there are online devices (YES in step S9-3), the processing proceeds to step S9-16. In step S9-16, the printing system 100 displays a device list. If there are no online device (NO in step S9-3), then in step S9-4, the printing system 100 displays a tap screen, which prompts the user to tap a device using NFC (FIG. 10). In step S9-5, the printing system 100 determines whether or not a device has been tapped using NFC. If a device has been tapped (YES in step S9-5), then in step S9-6, the printing system 100 acquires information about the ID and the tag of the NFC unit. In step S9-7, the printing system 100 acquires the URL of the device from the tag information. In step S9-8, the printing system 100 acquires the device information using the acquired URL. In step S9-9, the printing system 100 saves the acquired device information. In step S9-10, the printing system 100 selects the tapped device as a print destination. In step S9-11, the printing system 100 transmits print data to the selected device, thereby performing printing. If, on the other hand, a device has not been tapped (NO in step S9-5), then in step S9-12, the printing system 100 determines whether or not a skip button has been pressed. If the skip button has not been pressed (NO in step S9-12), the processing proceeds to step S9-13. In step S9-13, the printing system 100 determines whether or not a timeout has occurred. If a timeout has occurred in step S9-13 (YES in step S9-13), or if the skip button has been pressed in step S9-12 (YES in step S9-12), then in step S9-14, the printing system 100 performs a device search using a network protocol by the second search method. In step S9-15, the printing system 100 determines whether or not devices have been found. If devices have been found (YES in step S9-15), then in step S9-16, the printing system 100 displays a device list. If devices have not been found (NO in step S9-15), then in step S9-18, the printing system 100 gives an error indication stating that there is no device to perform printing. In step S9-17, the printing system 100 selects a device as a print destination from the device list. Then, in step S9-11, the printing system 100 transmits print data to the selected device, thereby performing printing.

Figure 23:
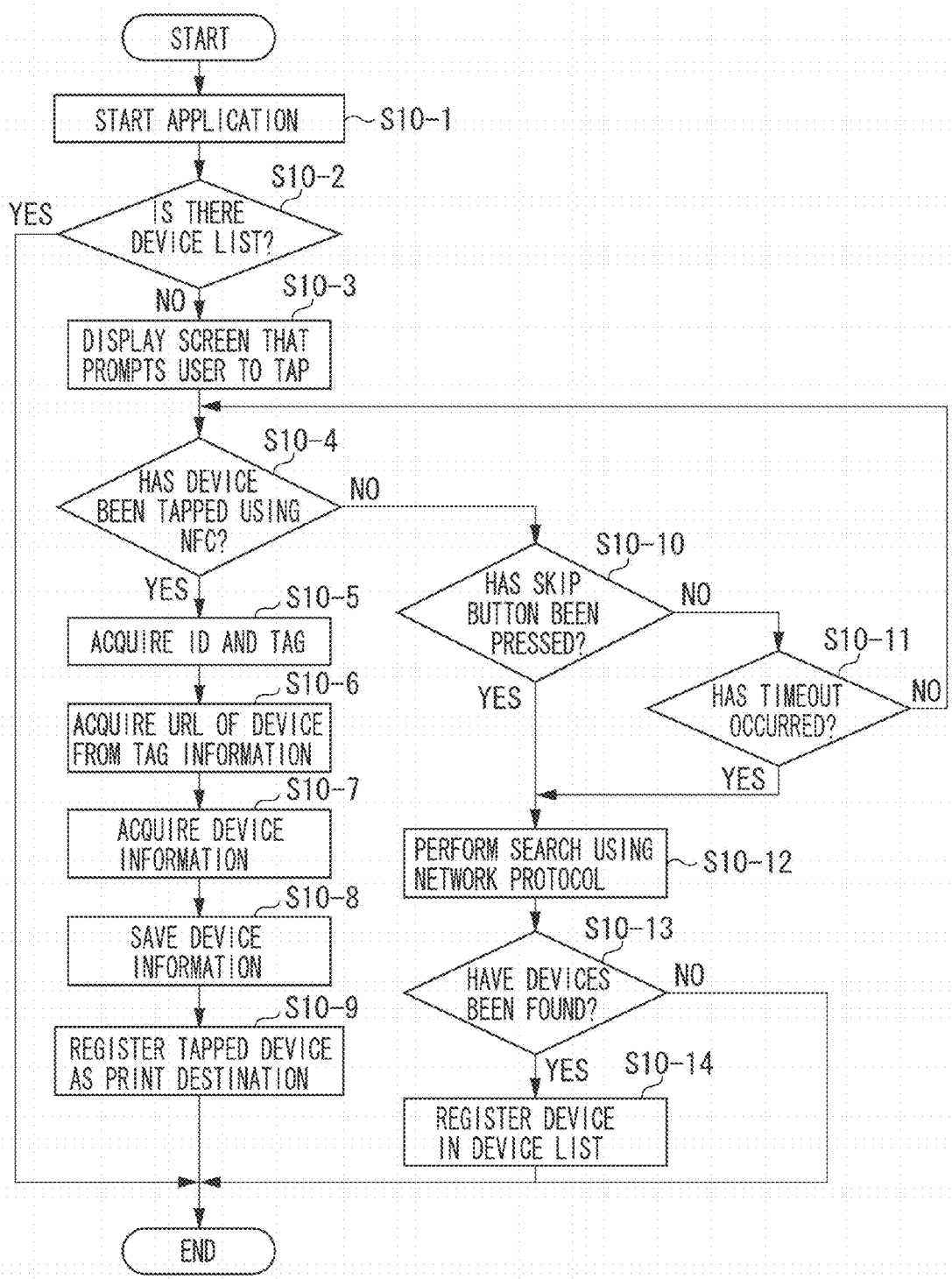
FIG. 23 is a flow chart illustrating the operation when an application has been started and there is no device list.

The tenth exemplary embodiment is described below. FIG. 23 is a flow chart illustrating the operation in the case where an application has been started when there is no device list.

In step S10-1, a document editing application is started. In step S10-2, the printing system 100 determines whether or not there is a device list in which devices are registered. If there is no device list (NO in step S10-2), then in step S10-3, the printing system 100 displays a tap screen, which prompts the user to tap a device using NFC (FIG. 10). If there is a device list (YES in step S10-2), the processing ends. In step S10-4, the printing system 100 determines whether or not a device has been tapped using NFC. If a device has been tapped (YES in step S10-4), then in step S10-5, the printing system 100 acquires information about the ID and the tag of the NFC unit. In step S10-6, the printing system 100 acquires the URL of the device from the tag information. In step S10-7, the printing system 100 acquires the device information using the acquired URL. In step S10-8, the printing system 100 saves the acquired device information. In step S10-9, the printing system 100 registers the tapped device as a print destination. If, on the other hand, a device has not been tapped (NO in step S10-4), then in step S10-10, the printing system 100 determines whether or not a skip button has been pressed. If the skip button has not been pressed (NO in step S10-10), the processing proceeds to step S10-11. In step S10-11, the printing system 100 determines whether or not a timeout has occurred. If a timeout has occurred in step S10-11 (YES in step S10-11), or if the skip button has been pressed in step S10-10 (YES in step S10-10), then in step S10-12, the printing system 100 performs a device search using a network protocol by the second search method. In step S10-13, the printing system 100 determines whether or not devices have been found. If devices have been found (YES in step S10-13), then in step S10-14, the printing system 100 registers the found devices in a device list.

Figure 24:
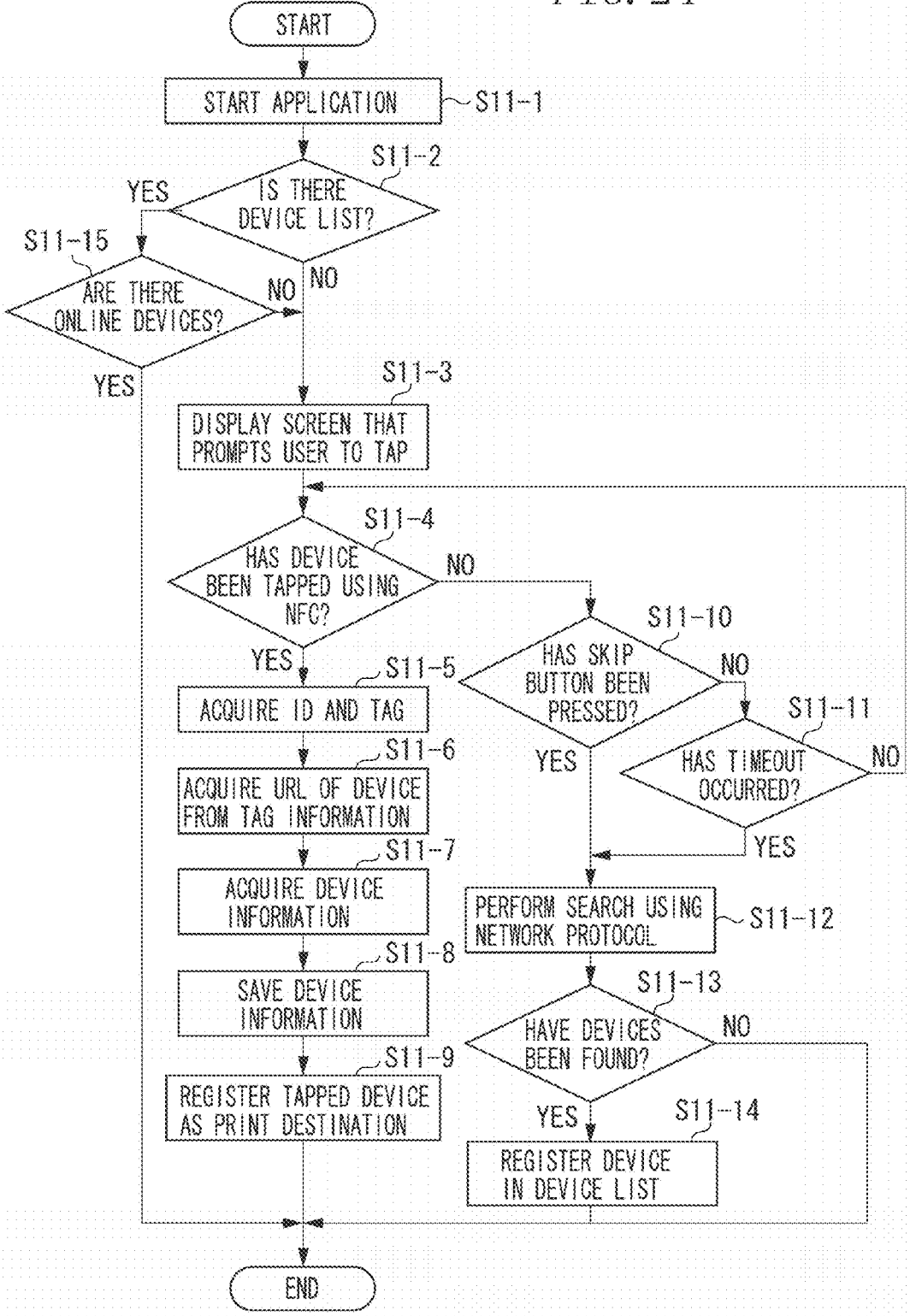
FIG. 24 is a flow chart illustrating the operation when an application has been started and there is no device list of online devices.

The eleventh exemplary embodiment is described below. FIG. 24 is a flow chart for determining whether or not there are online devices after an application has been started.

In step S11-1, a document editing application is started. In step S11-2, the printing system 100 determines whether or not there is a device list in which devices are registered. If there is a device list (YES in step S11-2), then in step S11-15, the printing system 100 determines whether or not there are online devices in the device list. If there are online devices (YES in step S11-15), the processing ends. If it has been determined in step S11-15 that there is no online device (NO in step S11-15), or if it has been determined in step S11-2 that there is no device list (NO in step S11-2), then in step S11-3, the printing system 100 displays a tap screen, which prompts the user to tap a device using NFC (FIG. 10). In step S11-4, the printing system 100 determines whether or not a device has been tapped using NFC. If a device has been tapped (YES in step S11-4), then in step S11-5, the printing system 100 acquires information about the ID and the tag of the NFC unit. In step S11-6, the printing system 100 acquires the URL of the device from the tag information. In step S11-7, the printing system 100 acquires the device information using the acquired URL. In step S11-8, the printing system 100 saves the acquired device information. In step S11-9, the printing system 100 registers the tapped device as a print destination. If, on the other hand, a device has not been tapped (NO in step S11-4), then in step S11-10, the printing system 100 determines whether or not a skip button has been pressed. If the skip button has not been pressed (NO in step S11-10), the processing proceeds to step S11-11. In step S11-11, the printing system 100 determines whether or not a timeout has occurred. If a timeout has occurred in step S11-11 (YES in step S11-11), or if the skip button has been pressed in step S11-10 (YES in step S11-10), then in step S11-12, the printing system 100 performs a device search using a network protocol by the second search method. In step S11-13, the printing system 100 determines whether or not devices have been found. If devices have been found (YES in step S11-13), then in step S11-14, the printing system 100 registers the found devices in a device list.

The twelfth exemplary embodiment is based on the premise that the mobile terminal 2000 can enable and disable the NFC function of the mobile terminal 2000 according to an instruction through the touch panel 2009 of the mobile terminal 2000.

Figure 25:
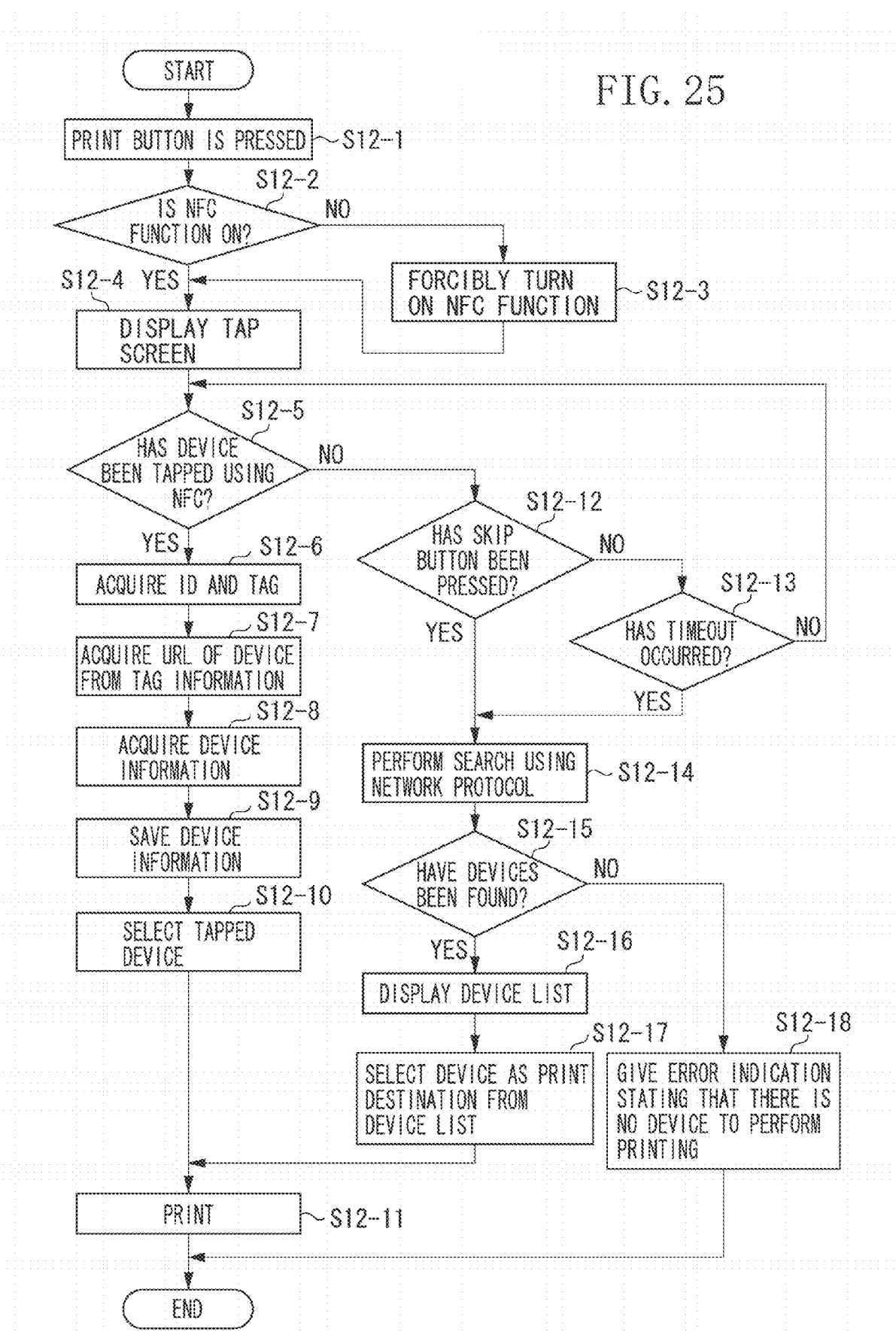

FIG. 25 is a flow chart illustrating an example of the case where, if the NFC function of the mobile terminal 2000 is off (disabled), then after a print button has been pressed, the NFC function is forcibly turned on (enabled) so that a screen for tapping a device using NFC is preferentially displayed.

In step S12-1, a print button in an application that is displaying a document is pressed. In step S12-2, the printing system 100 determines whether or not the NFC function is on. If the NFC function is off (NO in step S12-2), then in step S12-3, the printing system 100 forcibly turns on the NFC function. If the NFC function is on (YES in step S12-2), then in step S12-4, the printing system 100 displays a tap screen, which prompts the user to tap a device using NFC (FIG. 10). In step S12-5, the printing system 100 determines whether or not a device has been tapped using NFC. If a device has been tapped (YES in step S12-5), then in step S12-6, the printing system 100 acquires information about the ID and the tag of the NFC unit. In step S12-7, the printing system 100 acquires the URL of the device from the tag information. In step S12-8, the printing system 100 acquires the device information using the acquired URL. In step S12-9, the printing system 100 saves the acquired device information. In step S12-10, the printing system 100 selects the tapped device as a print destination. In step S12-11, the printing system 100 transmits print data to the selected device, thereby performing printing. If, on the other hand, a device has not been tapped (NO in step S12-5), then in step S12-12, the printing system 100 determines whether or not a skip button has been pressed. If the skip button has not been pressed (NO in step S12-12), the processing proceeds to step S12-13. In step S12-13, the printing system 100 determines whether or not a timeout has occurred. If a timeout has occurred in step S12-13 (YES in step S12-13), or if the skip button has been pressed in step S12-12 (YES in step S12-12), then in step S12-14, the printing system 100 performs a device search using a network protocol by the second search method. In step S12-15, the printing system 100 determines whether or not devices have been found. If devices have been found (YES in step S12-15), then in step S12-16, the printing system 100 displays a device list. If devices have not been found (NO in step S12-15), then in step S12-18, the printing system 100 gives an error indication stating that there is no device to perform printing. In step S12-17, the printing system 100 selects a device as a print destination from the device list. Then, in step S12-11, the printing system 100 transmits print data to the selected device, thereby performing printing.

Not only in the above exemplary embodiment but also in the cases of all the flow charts illustrated in the present specification, such as the case where a device is tapped while a device list is being displayed, or the case where a device is tapped while a document is being displayed, it is possible to forcibly enable the NFC function when the NFC function is disabled.

Figure 3:
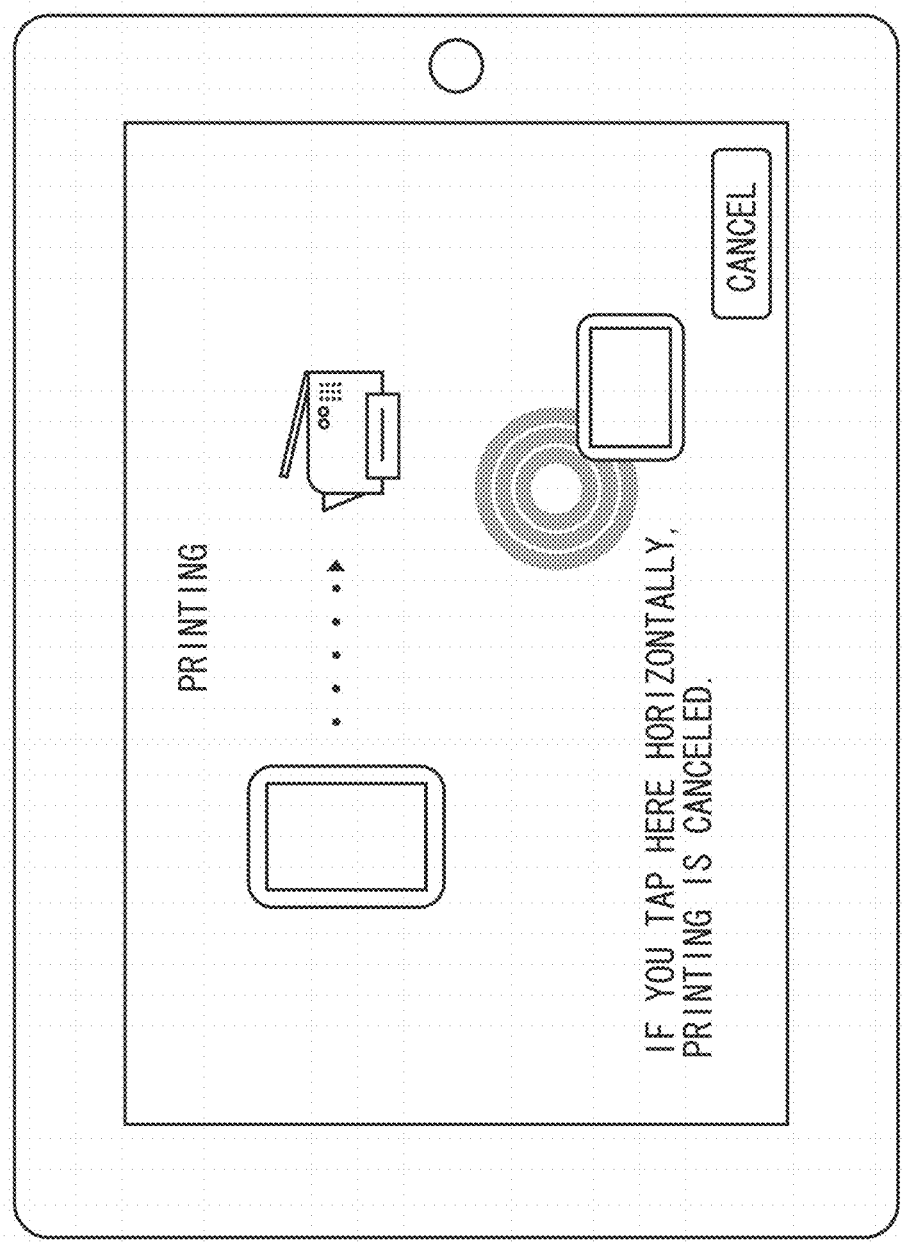
FIG. 3 illustrates a UI when printing is canceled.

The thirteenth exemplary embodiment is described below. FIG. 26 is a flow chart illustrating the operation in the case where printing is canceled. In step S13-1, a device is tapped using NFC while printing is being performed (FIG. 3). In step S13-2, the printing system 100 determines, using the direction determination unit 109 of the mobile terminal 2000, whether or not the mobile terminal 2000 is oriented horizontally. If the mobile terminal 2000 is not oriented horizontally (is oriented vertically) (NO in step S13-2), the processing proceeds to step S13-12. In step S13-12, the printing system 100 performs the processing at the time of a normal tap. The processing when a normal tap is performed is similar to the flow charts in FIGS. 8 and 11. If the mobile terminal 2000 is oriented horizontally (YES in step S13-2), then in step S13-3, the printing system 100 determines whether or not printing is being performed. If printing is not being performed (NO in step S13-3), the processing proceeds to step S13-12. In step S13-12, the printing system 100 performs the processing at the time of a normal tap. If printing is being performed (YES in step S13-3), then in step S13-4, the printing system 100 stops the transmission of print data. Then, in step S13-5, the printing system 100 transmits a print cancel command to the device of a print destination. If the printing has been cancelled, then in step S13-6, the printing system 100 acquires information about the ID and the tag of the NFC unit. In step S13-7, the printing system 100 acquires the URL of the device from the tag information. In step S13-8, the printing system 100 acquires the device information using the acquired URL. In step S13-9, the printing system 100 saves the acquired device information. In step S13-10, the printing system 100 selects the tapped device as a print destination. In step S13-11, the printing system 100 transmits print data to the selected device, thereby performing printing.

Figure 4:
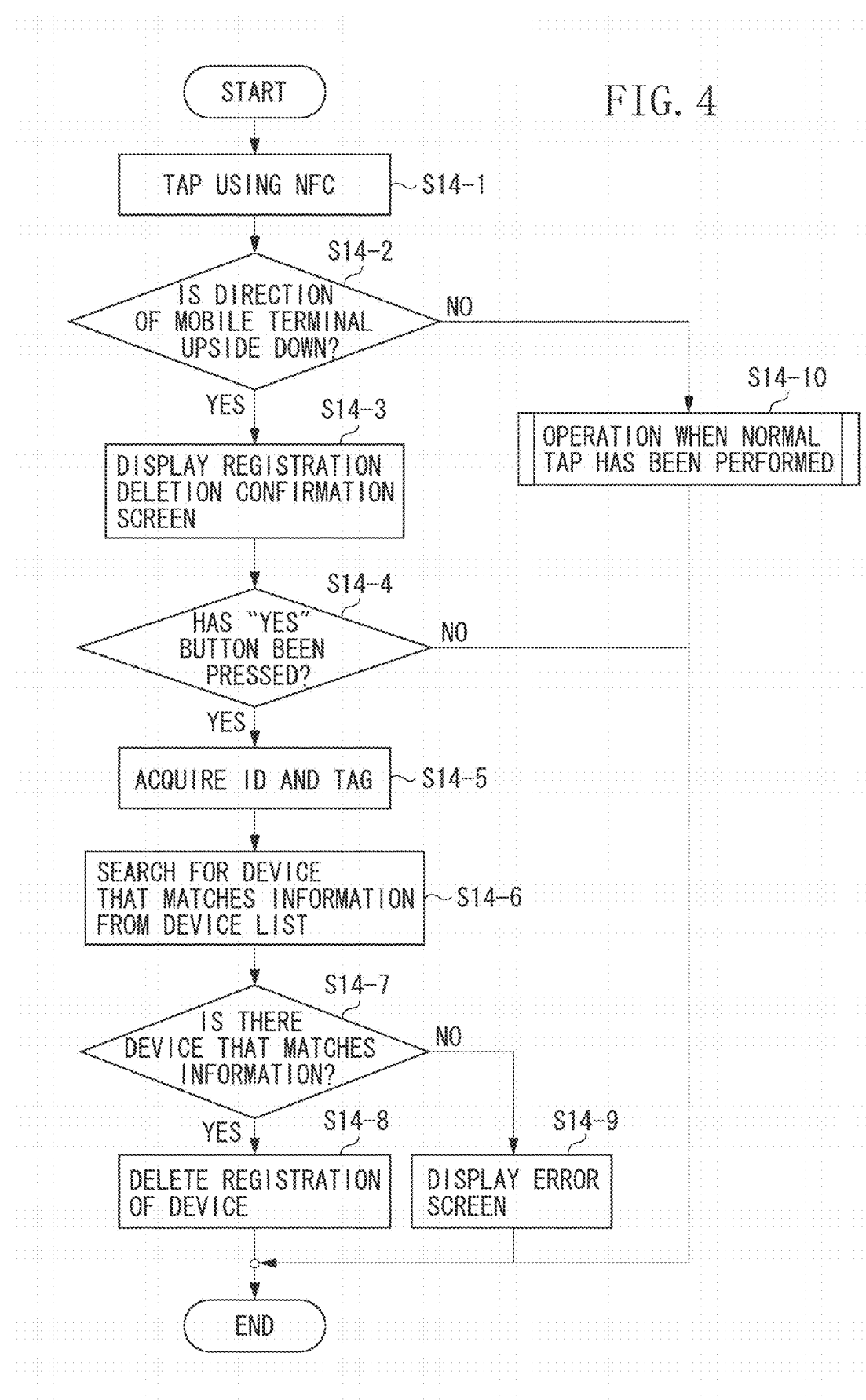
FIG. 4 is a flow chart illustrating the operation when a device is deleted.
Figure 6:
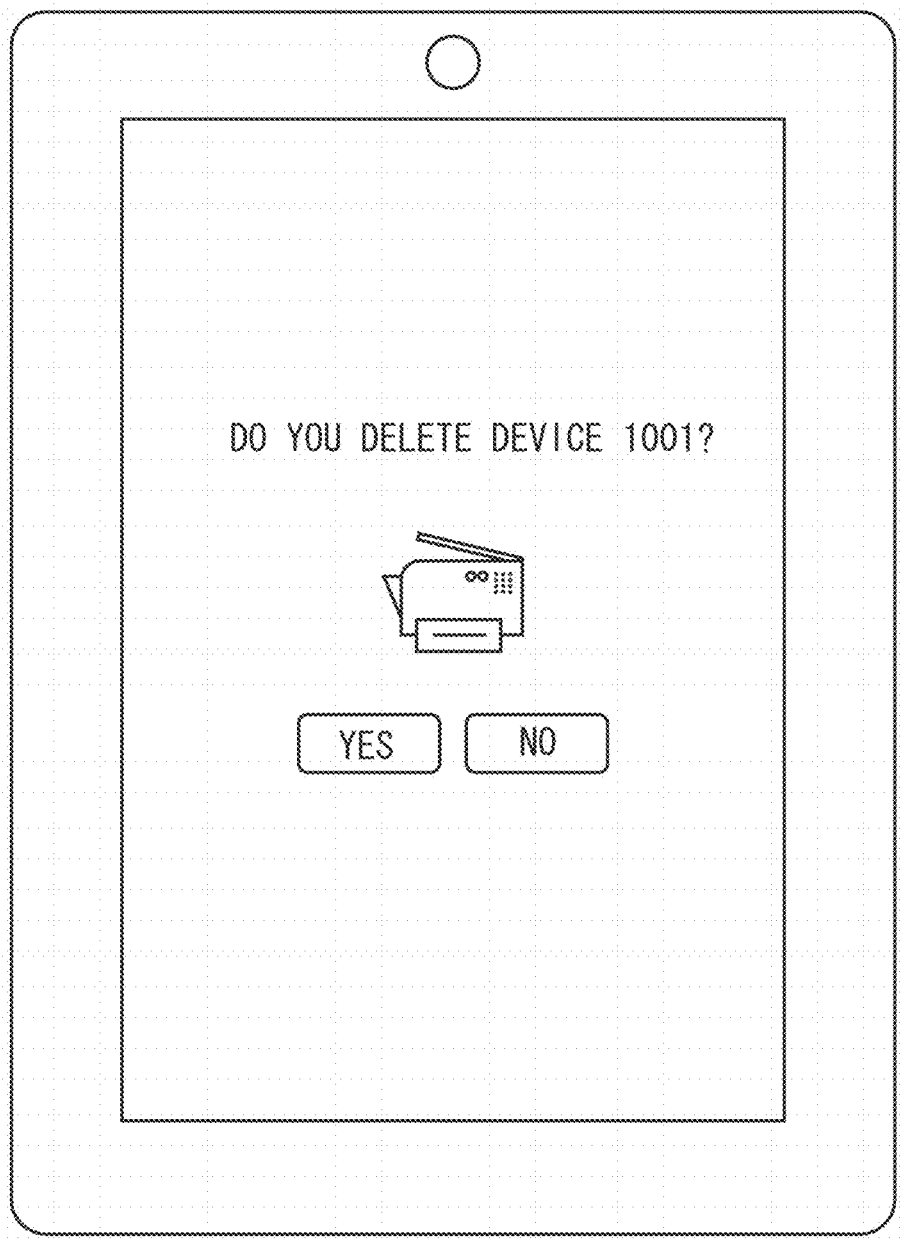
FIG. 6 illustrates a UI when the device is to be deleted.

The fourteenth exemplary embodiment is described below. FIG. 4 is a flow chart illustrating the operation when a registered device is deleted. In step S14-1, the printing system 100 detects a tap on a device using NFC. In step S14-2, the printing system 100 determines whether or not the direction of the mobile terminal 2000 is upside down. If the direction of the mobile terminal 2000 is not upside down (NO in step S14-2), the processing proceeds to step S14-10. In step S14-10, the printing system 100 performs the operation when a normal tap is performed. The operation when a normal tap is performed has already been described with reference to the flow charts in FIGS. 8 and 11. If the mobile terminal 2000 is upside down (YES in step S14-2), the processing proceeds to step S14-3. In step S14-3, the printing system 100 displays a registration deletion confirmation screen (FIG. 6). In step S14-4, the printing system 100 determines whether or not a "yes" button has been pressed. If the "yes" button has not been pressed (NO in step S14-3), the processing ends. If the "yes" button has been pressed (YES in step S14-3), then in step S14-5, the printing system 100 acquires information about the ID and the tag of the NFC unit. In step S14-6, the printing system 100 searches a device list for a device that matches the information. In step S14-7, the printing system 100 determines whether or not there is a device that matches the information. If there is a device that matches the information (YES in step S14-7), then in step S14-8, the printing system 100 deletes the registration of the device. If there is no device that matches the information (NO in step S14-7), then in step S14-9, the printing system 100 displays an error screen.

In the present exemplary embodiment, an example has been illustrated where control is switched based on whether or not a device has been tapped with the mobile terminal 2000 upside down. It is, however, only necessary to determine whether or not the mobile terminal 2000 has a particular inclination. Control may be switched based on the determination of whether the mobile terminal 2000 is oriented vertically or horizontally.

In the fifteenth exemplary embodiment, even if a device found in a device search using a network protocol has been selected from a device list of devices as print destinations, a device is selected using NFC within a certain time period after the selection of the found device, thereby, the device selected using NFC is determined as a print destination.

The present exemplary embodiment is specifically described. First, the printing system 100 displays a device list as illustrated in FIG. 12. Then, the printing system 100 determines whether or not a device found in a device search using a network protocol has been selected by the user. Then, if a device found in a device search using a network protocol has been selected, the printing system 100 determines whether or not a device has been tapped using NFC within a certain time period (for example, while print settings are being made). If a device has been tapped, the printing system 100 changes the print destination from the device found in a device search using a network protocol and selected by the user to the device tapped using NFC. Thus, it is possible to give preference to the selection of a device tapped using NFC over the selection of a device found in a device search using a network protocol.

Other Exemplary Embodiments

Further, the present invention is achieved also by performing the following process.

Software (a program) for achieving the functions of the above exemplary embodiments is supplied to a system or an apparatus via a network or various storage media, to cause a computer (or a CPU or a microprocessor unit (MPU)) of the system or the apparatus to read and execute the program.

In the specification, if it is possible to select both an image forming apparatus using near field communication and an image forming apparatus based on a device search on a network, the methods of selecting an image forming apparatus are determined according to priorities, thereby enabling improvement in the convenience of the user.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-176250 filed Aug. 28, 2013, which is hereby incorporated by reference herein in its entirety.

What is claimed is:

1. An information processing apparatus comprising:
   at least one processor and a memory having at least one application that, when executed by the at least one processor comprises:
   a first selection unit configured to select an image forming apparatus by using near field communication;
   a second selection unit configured to select an image forming apparatus capable of communicating by using a network;
   a transmission unit configured to transmit print data to the image forming apparatus selected by the first selection unit or the second selection unit;
   a display unit configured to display a screen prompting a user to select either the image forming apparatus selected by using the first selection unit or to select, by allowing the user to operate on the screen, the image processing apparatus selected by using the second selection unit without selecting the information processing apparatus selected by using the first selection unit;
   a registration unit configured to register in the information processing apparatus the image forming apparatus selected by the first selection unit
   wherein if the information processing apparatus is connected to a particular network and a certain time period has elapsed from the registration of the image forming apparatus on the particular network, the registration of the image forming apparatus is deleted from the information processing apparatus.

2. The information processing apparatus according to claim 1, wherein the display unit displays the screen that prompts a user to select the image forming apparatus by using the first selection unit,
   wherein, while the display unit is displaying the screen, the selection of the image forming apparatus made by the second selection unit is not received.

3. The information processing apparatus according to claim 1, wherein the first selection unit selects the image forming apparatus by using the near field communication while a screen for selecting the image forming apparatus by using the second selection unit is being displayed.

4. The information processing apparatus according to claim 1, wherein, if the first selection unit has selected the image forming apparatus as a print destination using the near field communication while a document is being displayed, the selection of the image forming apparatus made by the second selection unit is not received.

5. The information processing apparatus according to claim 1, wherein, if the first selection unit has selected the image forming apparatus as a print destination using the near field communication before a print instruction is given, the selection of the image forming apparatus made by the second selection unit is not received.

6. The information processing apparatus according to claim 1, wherein, if the information processing apparatus has tapped the image forming apparatus with the information processing apparatus oriented in a particular direction, the first selection unit selects the image forming apparatus as a print destination by using the near field communication.

7. The information processing apparatus according to claim 1, further comprising a second registration unit configured to register in the information processing apparatus the image forming apparatus selected by the first selection unit and the image forming apparatus selected by the second selection unit,
   wherein, if the second registration unit has registered the image forming apparatus in the information processing apparatus, a device search on a network for the second selection unit to select the image forming apparatus is not performed.

8. The information processing apparatus according to claim 7, further comprising a determination unit configured to determine whether or not an online image forming apparatus is present as the image forming apparatus registered by the second registration unit, wherein, if the determination unit has determined that the online image forming apparatus is present, a device search on a network for the second selection unit to select the image forming apparatus is not performed.

9. The information processing apparatus according to claim 8, further comprising a second display unit configured to, if the second registration unit has not registered the image forming apparatus in the information processing apparatus, display a screen that prompts a user to select the image forming apparatus by using the first selection unit or the second selection unit.

10. The information processing apparatus according to claim 9, wherein, if the determination unit has determined that the online image forming apparatus is present, the second display unit does not display the screen that prompts the user to select the image forming apparatus.

11. The information processing apparatus according to claim 1, further comprising:
a second determination unit configured to determine whether or not the near field communication is enabled; and
an enabling unit configured to, if the second determination unit has determined that the near field communication is disabled, forcibly enable the near field communication.

12. The information processing apparatus according to claim 1, further comprising a cancel unit configured to, if the information processing apparatus has tapped the image forming apparatus with a direction of the information processing apparatus being a particular direction, cancel printing.

13. The information processing apparatus according to claim 7, further comprising a deletion unit configured to, if the information processing apparatus has tapped the image forming apparatus with the information processing apparatus oriented in a particular direction, delete the registration of the image forming apparatus registered by the second registration unit.

14. The information processing apparatus according to claim 1, wherein, even when the second selection unit has selected the image forming apparatus, if the first selection unit has selected the image forming apparatus within a certain time period from the selection of the image forming apparatus made by the second selection unit, the image forming apparatus selected by the second selection unit is changed to the image forming apparatus selected by the first selection unit.

15. A non-transitory storage medium having stored thereon a set of instructions that, when executed by one or more processors of an information processing apparatus causes the information processing apparatus to execute a method, the method comprising:
selecting an image forming apparatus by using near field communication;
selecting an image forming apparatus capable of communicating by using a network;
transmitting print data to the image forming apparatus selected
displaying a screen prompting a user to select either the image forming apparatus selected by using the first selection unit or to select, by allowing the user to operate on the screen, the image processing apparatus selected by using the second selection unit without selecting the information processing apparatus selected by using the first selection unit; and
registering in the information processing apparatus the image forming apparatus selected by the first selection unit,
wherein, if the information processing apparatus is connected to a particular network and a certain time period has elapsed from the registration of the image forming apparatus on the particular network, the registration of the image forming apparatus is deleted from the information processing apparatus.

16. A method of controlling an information processing apparatus comprising:
selecting an image forming apparatus by using near field communication;
selecting an image forming apparatus capable of communicating by using a network;
transmitting print data to the image forming apparatus selected
displaying a screen prompting a user to select either the image forming apparatus selected by using the first selection unit or to select, by allowing the user to operate on the screen, the image processing apparatus selected by using the second selection unit without selecting the information processing apparatus selected by using the first selection unit; and
registering in the information processing apparatus the image forming apparatus selected by the first selection unit,
wherein, if the information processing apparatus is connected to a particular network and a certain time period has elapsed from the registration of the image forming apparatus on the particular network, the registration of the image forming apparatus is deleted from the information processing apparatus.

* * * * *